United States Patent
Ball

(10) Patent No.: US 7,738,008 B1
(45) Date of Patent: Jun. 15, 2010

(54) INFRARED SECURITY SYSTEM AND METHOD

(75) Inventor: Gary Edward Ball, The Woodlands, TX (US)

(73) Assignee: Infrared Systems International, Inc., The Woodlands, TX (US)

(*) Notice: Subject to any disclaimer, the term of this patent is extended or adjusted under 35 U.S.C. 154(b) by 274 days.

(21) Appl. No.: 11/592,639

(22) Filed: Nov. 3, 2006

Related U.S. Application Data

(60) Provisional application No. 60/597,048, filed on Nov. 7, 2005.

(51) Int. Cl.
*H04N 7/18* (2006.01)
*H04N 5/225* (2006.01)

(52) U.S. Cl. .................... 348/159; 348/169

(58) Field of Classification Search ............. 348/143, 348/151–159, 161, 169
See application file for complete search history.

(56) References Cited

U.S. PATENT DOCUMENTS

| | | | | |
|---|---|---|---|---|
| 4,563,005 A | | 1/1986 | Hand et al. | |
| 4,737,847 A | * | 4/1988 | Araki et al. | 348/161 |
| 5,001,650 A | * | 3/1991 | Francis et al. | 348/169 |
| 5,164,827 A | * | 11/1992 | Paff | 348/143 |
| 5,365,597 A | | 11/1994 | Holeva | |
| 5,592,151 A | * | 1/1997 | Rolih | 340/584 |
| 5,844,603 A | * | 12/1998 | Ogata | 348/155 |
| 6,028,626 A | * | 2/2000 | Aviv | 348/152 |
| 6,079,862 A | * | 6/2000 | Kawashima et al. | 382/103 |
| H1914 H | | 11/2000 | Watkins | |
| 6,330,025 B1 | * | 12/2001 | Arazi et al. | 348/143 |
| 6,424,370 B1 | * | 7/2002 | Courtney | 348/143 |
| 6,639,596 B1 | | 10/2003 | Shum et al. | |
| 6,985,172 B1 | * | 1/2006 | Rigney et al. | 348/149 |
| 7,398,057 B2 | * | 7/2008 | Stefani et al. | 455/68 |
| 2004/0130620 A1 | * | 7/2004 | Buehler et al. | 348/143 |
| 2004/0208375 A1 | * | 10/2004 | Gupta et al. | 382/217 |
| 2006/0061653 A1 | * | 3/2006 | Hampapur et al. | 348/143 |

* cited by examiner

*Primary Examiner*—David Czekaj
(74) *Attorney, Agent, or Firm*—Carl F. Melito

(57) ABSTRACT

An infrared (IR) security system and method is disclosed comprising two or more IR cameras directed upon a common surveillance area. Locations of the cameras and their optical fields of view are pre-established and stored in a central computer database. Computer programs harmonize the information into a 3D grid. The camera processors perform image processing on the surveillance area to detect moving objects. Object angular position, size, aspect ratio, and radiometric intensity are simultaneously transmitted to the central computer. The grid position, physical size, and inherent electromagnetic contrast of the objects are computed. These IR signatures are then compared to the target definitions in the database of IR signatures on pre-defined threats. Alarm criteria can be based on object size, location, and movement over time. When a threat is determined, the user is notified by text message, image or video.

44 Claims, 15 Drawing Sheets

Properties of Isosceles Triangles

| Triangle Shape | Cardinal Points | Properties |
|---|---|---|
| Standard | A, B, & C<br>a, b, & c | angles<br>legs |
| Vertical Plane | A maps into SA#1<br>B maps into SA#2<br>C maps into Co | location (-Roh/2, 0, h1)<br>location (+Roh/2, 0, h2)<br>location (0,0,0) |

Vertical Plane is rotated about an axis formed by SA#1 & SA#2, (Roh)

| | | |
|---|---|---|
| Tilted Vertical Plane (SA#1) | C moves to Ca | Ca = the Centerline of SA #1 FOV |
| | RsSA1 vector | is the slant range between SA #1 (110) and the horizontal plane |
| | Ca | location is (Xoa, Yoa, 0) |
| | RsSA1 vector | Defined by polar angles Theta & Phi. |
| Tilted Vertical Plane | C moves from Ca to Cb | Cb = the Centerline of SA #2 FOV |
| | RsSA2 vector | is the slant range between SA #2 (120) and the horizontal plane. |
| | Cb | location is (Xob, Yob, 0) |
| | RsSA2 vector | Defined by polar angles Theta & Phi |
| Harmonization Method 1 | Compute Theta & Phi from above transforms | Simplified method to compute Ca & Cb Coordinates |

Fig. 4B

| Item | Symbol | Identifier | Angular Coordinates | Grid location | Invention Relationship |
|---|---|---|---|---|---|
| Sensor Assy. | SA #1 | 110 | Fig. 4 | -Ro/2, 0, h1 | Fixed Point |
| Sensor Assy. | SA #2 | 120 | Fig. 4 | +Ro/2, 0, h2 | Fixed Point |
| SA pole | h1 | - | n.a. | -Ro/2, 0, 0 | Pole Base |
| SA pole | h2 | - | n.a. | +Ro/2, 0. 0 | Pole Base |
| SA #1 FOV | RsSA1 | - | Theta A, Phi | vector | Centerline of FOV |
|  | Ca | 401 | Fig. 4 | Xoa, Yoa, 0 | Grid point |
| SA #2 FOV | RsSA2 |  | Theta B, Phi | vector | Centerline of FOV |
|  | Cb | 402 | Fig. 4 | Xob, Yob, 0 | Grid point |
| Range | Ro | - | Fig. 4C | Ro/2, 0, 0 to –Ro/2, 0, 0 | Base of h2 to h1 |
| SA range | Roh | - | Fig. 4A | -Ro/2, 0, h1 to Ro/2, 0, h2 | Between SA #1 - #2 |
| ▲, Triangle 1 | SA #1, SA #2, & Ca | Cardinal Points | Fig. 4A | (-Ro/2, 0, h1), (Ro/2, 0, h2), (Xoa, Xob, 0) | Defines centerline SA #1 |
| ▲ Triangle 2 | SA #1, SA #2, & Cb | Cardinal Points | Fig. 4A | (-Ro/2, 0, h1), (Ro/2, o, h2), (Xob, Yob, 0) | Defines centerline SA #2 |
| ▲, method 1 Harmonization Triangle 3A | SA #1, SA #2, & Ca | Fig. 4A | Theta Ao, Theta B Phi A | Ro, h1 & h2 | Compute Rsao |
| ▲, method 1 Harmonization Triangle 3B | SA #1, SA #2, & Cb | Fig. 4C | Theta A, Theta Bo, Phi B | Ro, h1, & h2 | Compute Rsbo |
| ▲, method 2 Harmonization Triangle 4 | SA #1, SA #2, & OIP | Fig. 13 | Theta 1 & Theta 2 | Ro, h1 & h2 | Compute Rs1, Rs2 |
| OIP method 2 | OIP & SA #1 | Fig. 14, 403 | Az, El, | Ro, h1, & h2 | Compute Xoa, Yoa |
| OIP method 2 | OIP & SA #2 | Fig, 14, 403 | Az, El | Ro, h1, & h2 | Compute Xob, Yob |
| Method 3 Harmonization | Rg2, Rg1 | Fig. 13 | Theta 1 & Theta 2 | Ro, h1, & h2 Cosine Law | Compute Ca & Cb |
| Target Location | T (x,y,z) | Fig. 14, 403 | Az, El SA-#1 & Az, El SA #2 | Ca & Cb coordinates known | Compute Target location |
| Target Location, Method 2 | SA #1 & SA #2 | Directional Cosines | Theta, Phi | Ro, h1, h2 | Compute Target Location |

| Event or Object of interest | SET | Time Start | Stop | Alert | Event | Record Video | Target Size (Min) | Target Size (Max) |
|---|---|---|---|---|---|---|---|---|
| | | TBD | TBD | | | | Sq. ft. | Sq. ft. |
| Man | y/n | | | L/o | L/o | L/o | 3 | 8 |
| Child | y/n | | | L/o | L/o | L/o | 2 | 3 |
| Small Animal | y/n | | | L/o | L/o | L/o | 1 | 2 |
| Large Animal | y/n | | | L/o | L/o | L/o | 8 | 15 |
| Automobile | y/n | | | L/o | L/o | L/o | 15 | 25 |
| Small Truck | y/n | | | L/o | L/o | L/o | 15 | 35 |
| Large Truck | y/n | | | L/o | L/o | L/o | 15 | 50 |
| Semi | y/n | | | L/o | L/o | L/o | 15 | 100 |
| Hazard | y/n | | | L/o | L/o | L/o | | > 100 |
| No Video | X | n.a. | n.a. | X | n.a. | | n.a. | n.a. |
| Loss of Power | X | n.a. | n.a. | X | n.a. | | n.a. | n.a. |
| Camera NUC | X | 15 m | | n.a. | n.a. | X | n.a. | n.a. |
| IR Scene Balance | X | At NUC | n.a. | n.a. | X | X | n.a. | n.a. |
| Security Box | y/n | | | | | | Pt. size | Pt. Size |
| Legend | | | | | | | | |
| y/n = yes/no | y/n | | | | | | | |
| TBD selected | | Start | Stop | | | | | |
| L/o, selection insert L or 0 | | | | A-D, or o | A-D or o | A-D or o | | |
| Target Size selectable | | | | | | | Default | Default |

| | Ref. | Fig. 9A | Fig. 9A | Fig. 9A | Fig. 9 B | |
|---|---|---|---|---|---|---|
| Security Zones | | Zone A | Zone B | Zone C | Custom | All |
| Alert Level | (180) | x/o | | | | A |
| Event Level | (189) | | x/o | | | B |
| Record Level | (180) | | | x/o | | C |
| Custom | Fig. 9B | | | | x/o | D |
| Security Box | Fig. 12 | | x/o | | | |
| Security Box | Fig. 12 | | | x/o | | |

INFRARED SECURITY SYSTEM AND METHOD

RELATED APPLICATIONS

This application claims the benefit of provisional application Ser. No. 60/597,048 filed Nov. 7, 2005 to Ball entitled Infrared Security System (ISS), which is incorporated herein by reference in its entirety including claims and figures.

BACKGROUND

Security systems using infrared (IR) cameras have been successfully employed for many years. When the first images produced in total darkness were demonstrated, the application as a night vision security device was obvious to all. This ability to see at night under unlighted conditions has proved quite useful. Early systems were based upon a single camera, and the detection capability was good. They became more effective when they were combined with a trained operator to interpret the image scene. The recent trend has been toward greater automation of these systems using artificial intelligence; and employing expensive high-resolution cameras to provide greater image detail to analyze potential threats.

Today, IR security systems employ image-processing software to automatically detect targets. These sophisticated algorithms discriminate between true and false targets by combining low-resolution motion detection with high-resolution shape recognition. High-resolution IR cameras are very expensive and cost prohibitive for many applications. The results have been good, but needed improvements in false alarm detection have been disappointing. In spite of the progress, these techniques are too expensive and have been unable to replace the human operator.

Security systems using IR technology are powerful because of their ability to detect humans (i.e. warm blooded objects), but they can be fooled by false detections, clutter, or naturally occurring events in the image scene. Performance is further reduced by decreased sensitivity resulting from climatic conditions (i.e. fog, rain, snow, dust, etc.) or excessive range to their targets.

The key to an effective security detection system is measured by two criteria: (1) the probability of detection of a true target when present, and (2) the frequency of false alarms of the system when a true target was not present. The perfect system is 100% probability for (1) and 0% occurrence for (2). One approach has been to make the definition of a target of interest broad enough to ensure all true targets are detected (100%) and to develop algorithms to detect false targets while retaining the true targets. Elaborate sets of spatial, motion, location, and image feature recognition techniques have been tried, and some are in use today. However, there remains much room for improvement.

For the foregoing reasons, there is a clear and long felt need for an IR security system and method that achieves the high-resolution threat discrimination of newer, more expensive IR cameras from less costly, low-resolution IR cameras, while avoiding false alarms due to clutter. Such robust and inexpensive target detection would allow the threat criteria to be expanded into behavioral observations and activities unattainable by current systems. Full automation, resulting in elimination of a dedicated human operator while maintaining high detection probabilities with low false alarm rates, is a need yet to be satisfied.

SUMMARY

An infrared (IR) security system and method is disclosed comprising two or more IR cameras directed upon a common surveillance area. Locations of the cameras and their optical fields of view are pre-established and stored in a central computer database. Computer programs harmonize the information into a three-dimensional (3D) grid. The camera processors perform image processing on the surveillance area to detect moving objects. Object angular position, size, aspect ratio, and radiometric intensity are simultaneously transmitted to the central computer. The grid position, physical size, and inherent electro-magnetic contrast of the objects are computed. These IR signatures are then compared to the target definitions in the database of IR signatures on pre-defined threats, and on false alarms if any. Alarm criteria are based on size, location, and movement over time. When a threat is determined, the user is notified by text message, image or video.

The present invention is based upon application of the principles of an isosceles triangle. Two IR cameras and a target form the points of the triangle. The known elements of the triangle are the distance between the two cameras and the angles between each camera and the target. The algorithms employed by the present invention are based upon congruent properties derived from the law of sines, the law of cosines, directional cosine transformations, and trigonometric functions from Euclidean Geometry. The range to the target from each camera is precisely calculated, and the target size is determined based on its' angular dimensions. The apparent thermal contrast of the target is measured at each camera, and the inherent thermal contrast is calculated.

The present invention provides to the user significant cost savings to meet a given level of security. It is directed to an IR security system and method that eliminates the need for a dedicated human operator. The present invention satisfies the long felt need for an inexpensive way to detect security threats by using at least two low-resolution IR cameras and logic to accomplish precise detection of targets that meet strict threat criteria based on the harmonized information obtained by the cameras.

Automated surveillance is accomplished by combining unique properties of simultaneous, independent detection, independent size correlation, and accurate physical size and location discrimination of at least two IR cameras. Threat definition can be expanded to include behavioral characteristics that are discernible by "tracking" a target's movements over time creating an IR signature. Typical threat behavior characteristics are: loitering, stalking, assaults, lying-in-wait and fleeing.

The present invention includes the interactive use of secured wireless technology to provide electronic identification, which is correlated in real time with IR detection targeting. A user, with a wireless hand held device like a video cell phone, becomes an integral extension of the security system of the present invention. Rather than monitoring the scene, however, the user is now only reviewing what the present invention automatically determines to be a threat, or person of interest, from pre-determined IR signatures established at system installation and from use over time. These IR signatures are stored in a database for future reference. For example, if a detected target, such as a person, is first verified as a true target, but is not a threat, the person then becomes a source of information for initial or continued detection of events and is stored in the database as such. A person not having the same IR signature as a known threat can be reported as such in real time on the cell phone video display. After viewing this video by the user, if the person represents an at risk element, as defined by the security requirement, an IR signature of the person will be stored in the database as a threat and in the future, an alarm will accompany any video display matching that IR signature. In this way, the IR security system of the present invention learns over time.

The user is now in a position to receive, threat alerts specific to their real time and location. The user, in this way, can be kept current, in real time, on the threat as it evolves. The receipt of images of the threat assists in recognizing the threat. Alerts provide the time and flexibility to the user to either confront or avoid the verified threat. A homeowner will have an accurate status of the security of a home prior to returning home. This is particularly important since recent trends indicate that forced entries, car jackings, assaults, and home invasions are increasingly being directed at homeowners and businesses at the time of return. The security system is often turned off at this time, which provides the window of vulnerability.

The system and method defined by this invention is applicable to the detection and recognition of most warm-blooded animals of all sizes. The threats to farms can take several forms: humans, animals, or insect swarms feeding on crops. The discrimination power of the invention allows all human and animal threats to be detected. Each threat can be handled differently. Insect swarms would need to take identifiable shapes or IR signatures. This gives the user real time information, specific threat classification (an image), and the latitude to respond accordingly. The response to 500 rabbits would be different than the response to one rabbit.

The present invention's many applications provide additional security to the user by the inherent ability of IR imaging to monitor the entire scene simultaneously for safety threats such as fire, excessive heating, etc. The inherent image processing of either sensor assembly allows for early detection of natural hazards, faulty machinery, and other dangers not associated with human activity.

DRAWINGS

FIG. 4B is a definition of terms and properties of FIG. 4A:

FIG. 4F is a table that depicts the relationships (angular and rectangular reference frames) to principle elements of the invention, including text and figure identifiers;

Figure 1:
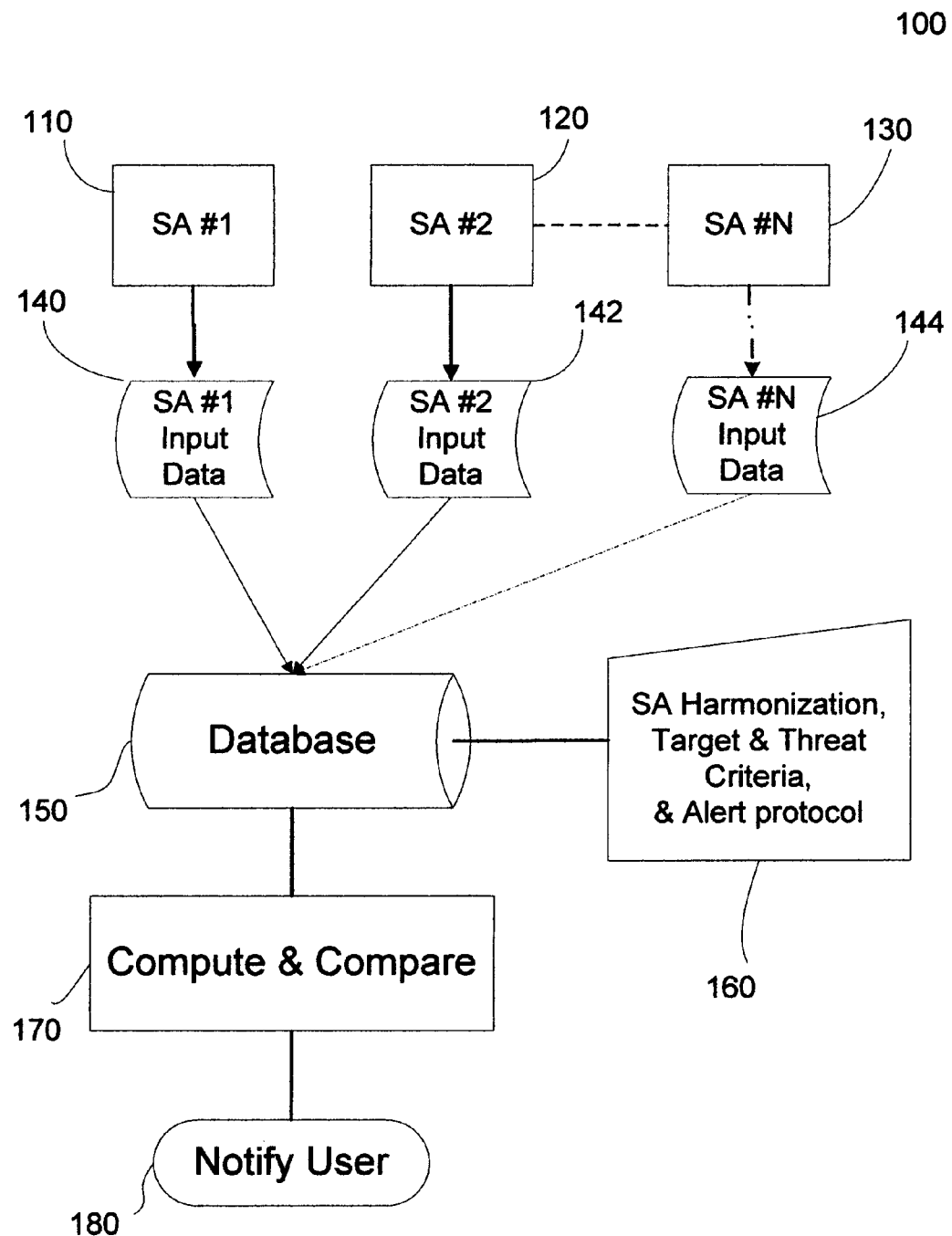
FIG. 1 is a flow diagram of a preferred embodiment of the present invention.
Figure 3:
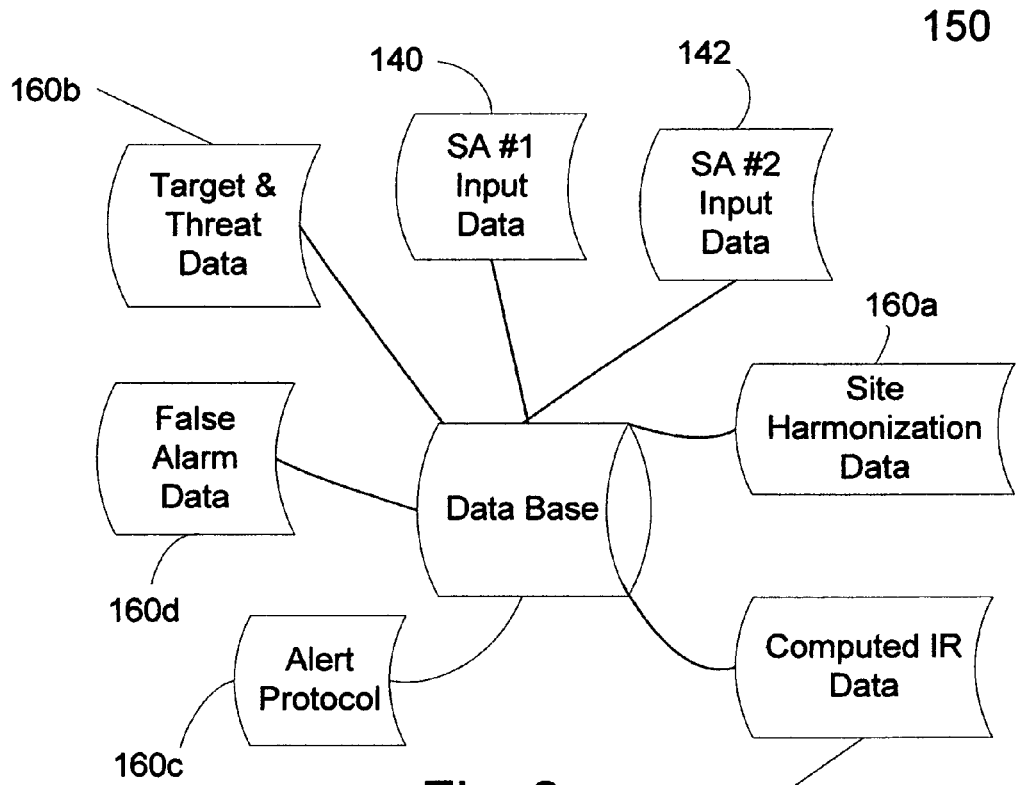
FIG. 3 illustrates the types of data stored in the database 150 of FIG. 1.
Figure 6:
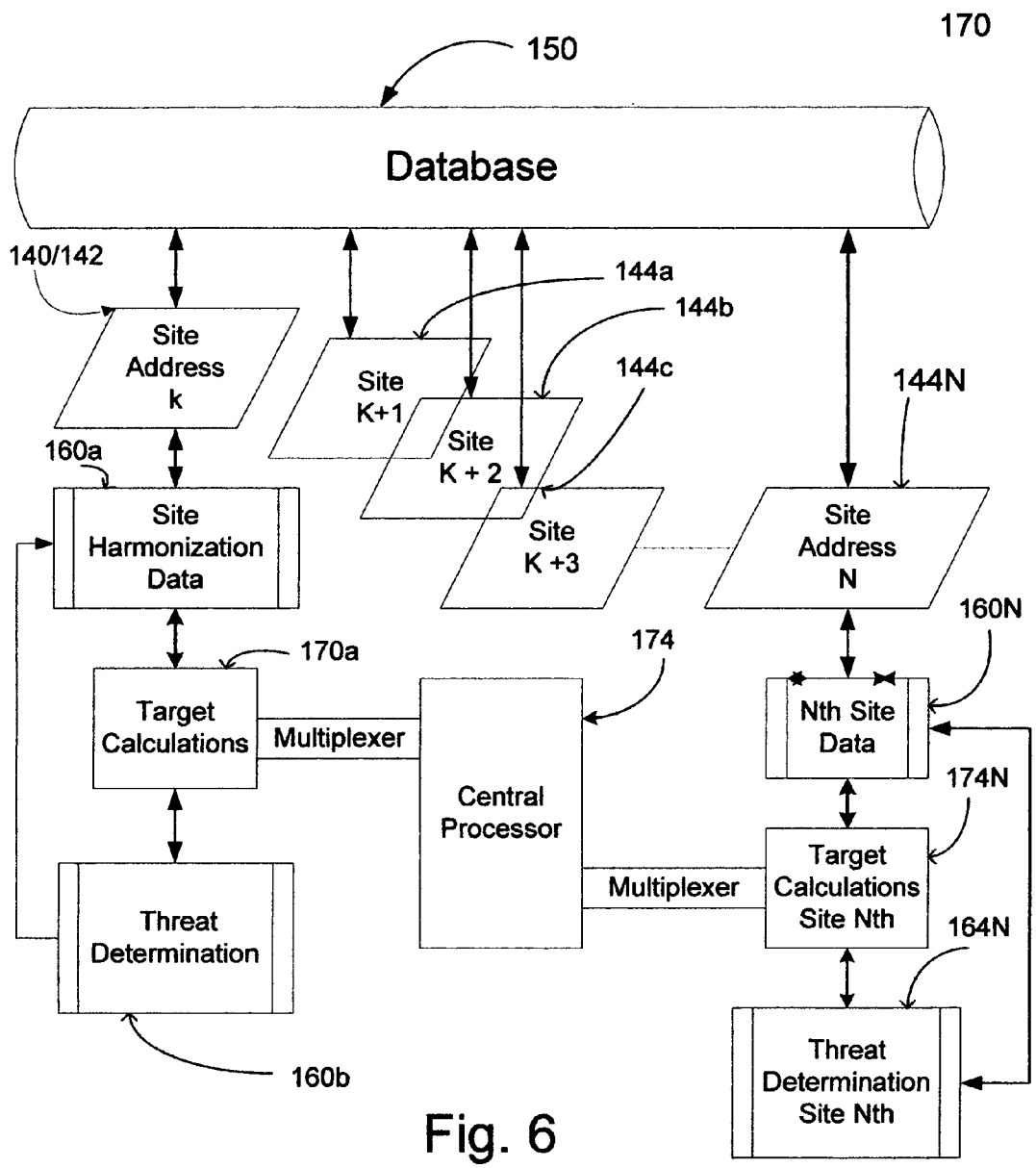
Figure 7A:
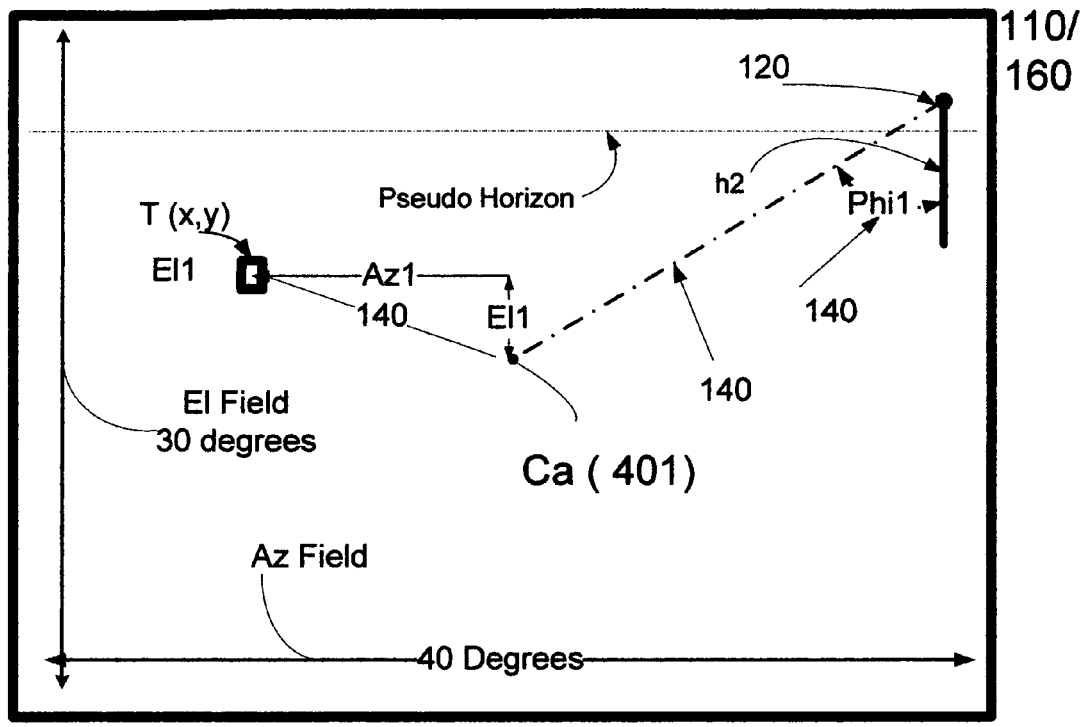
Figure 7B:
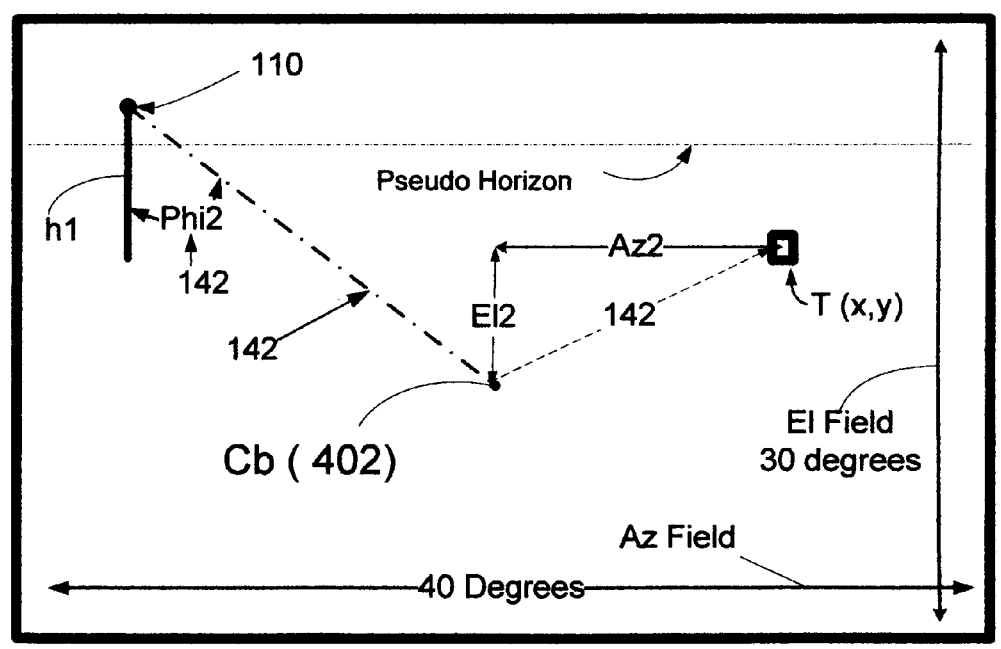
Figure 8:
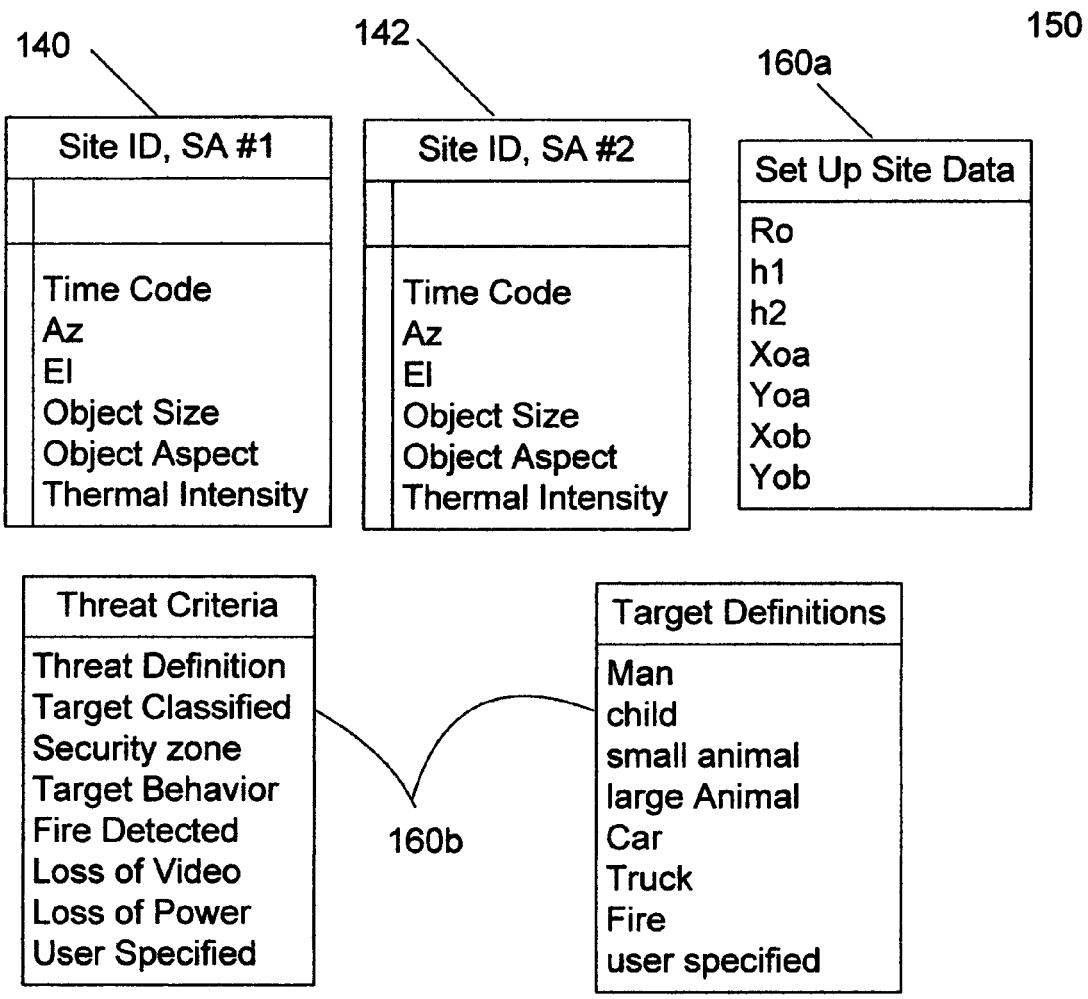
Figure 9A:
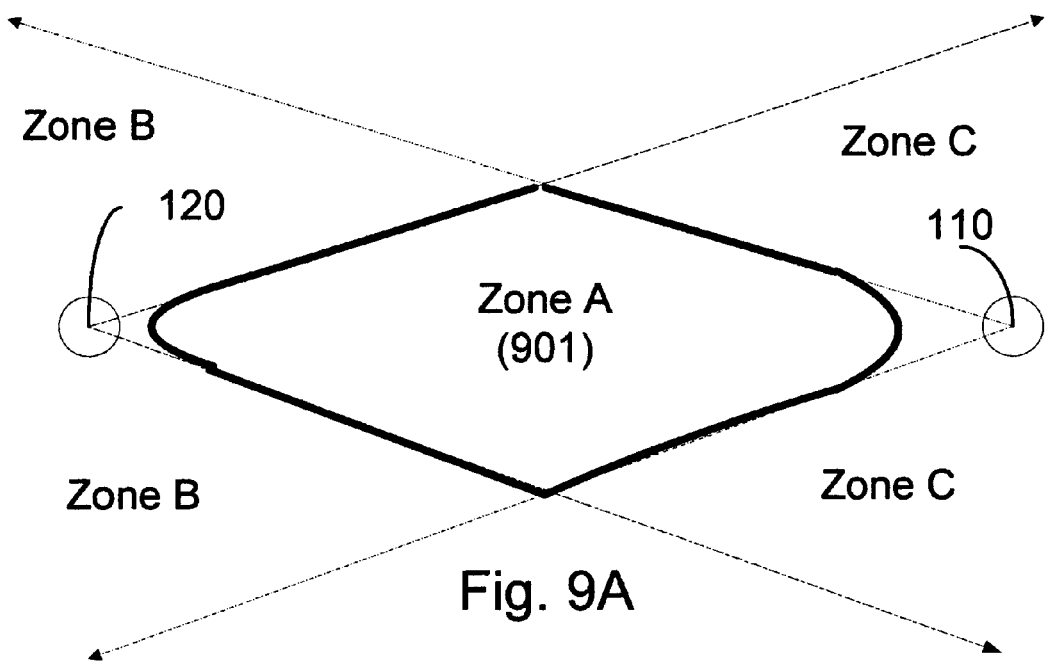
Figure 9B:
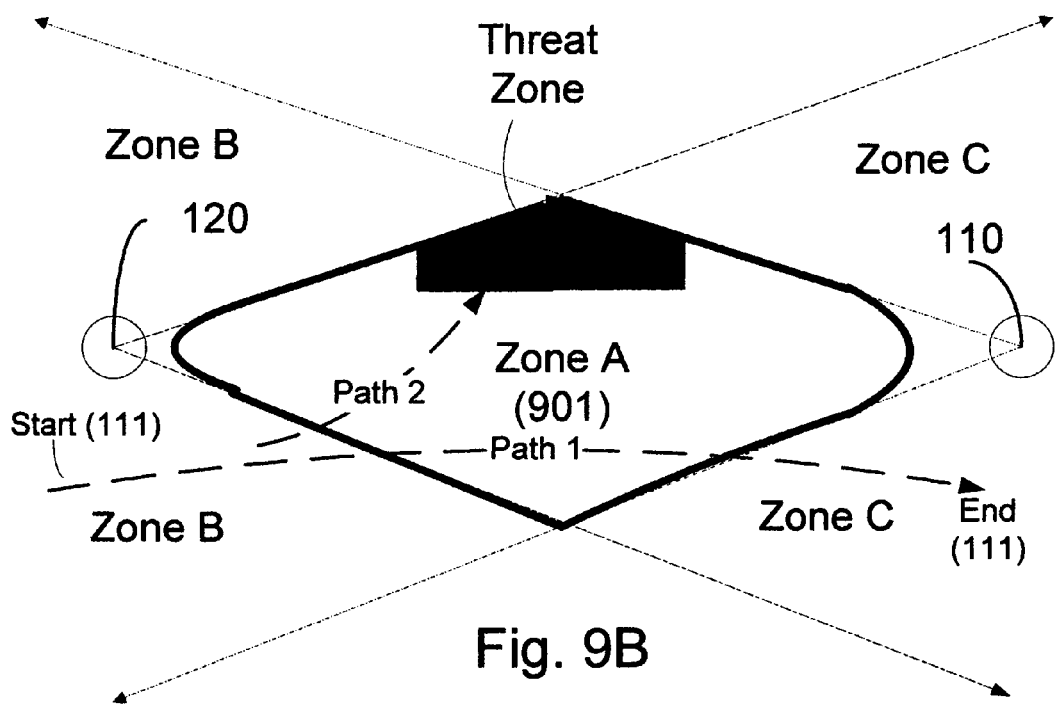
Figure 11:
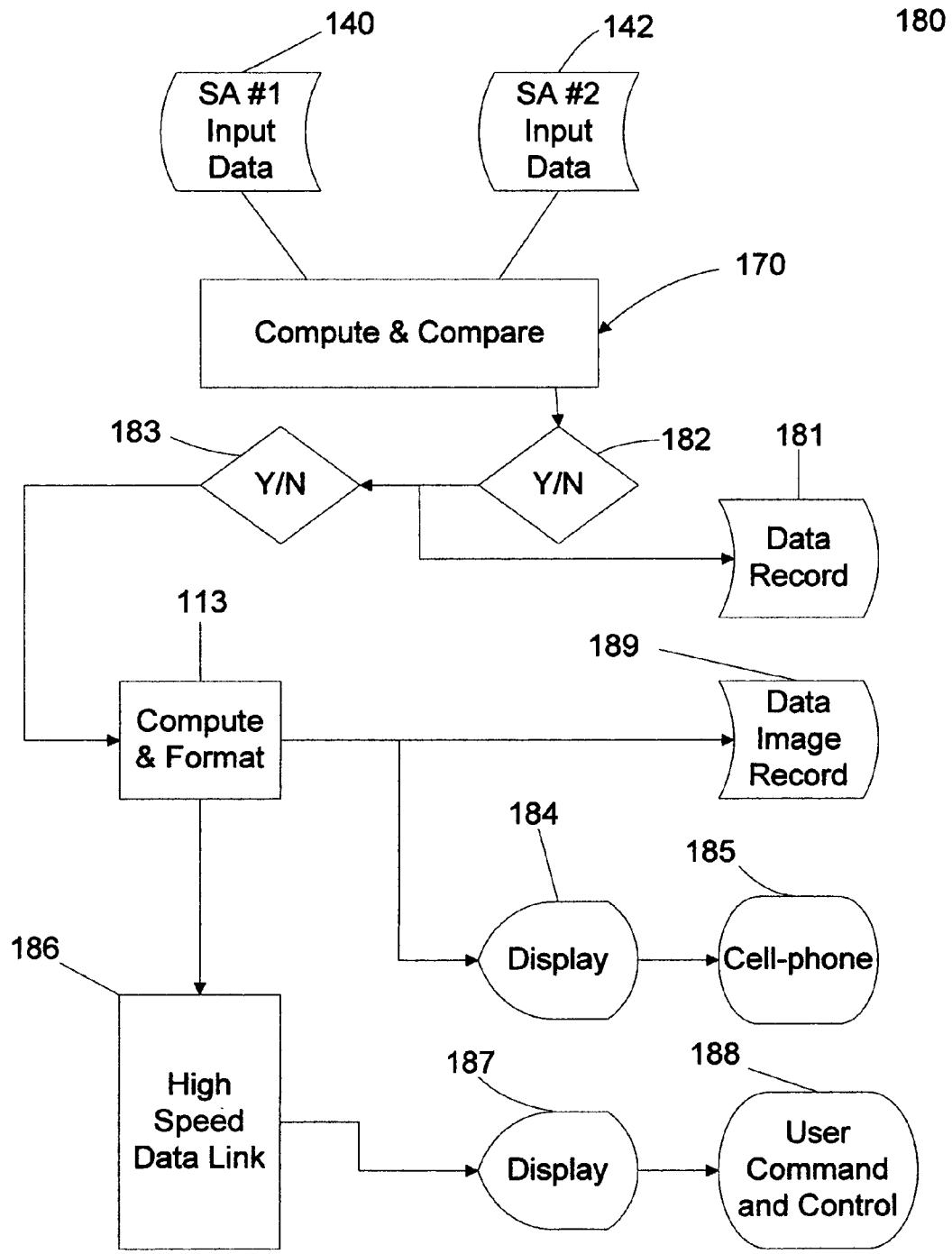
Figure 12A:
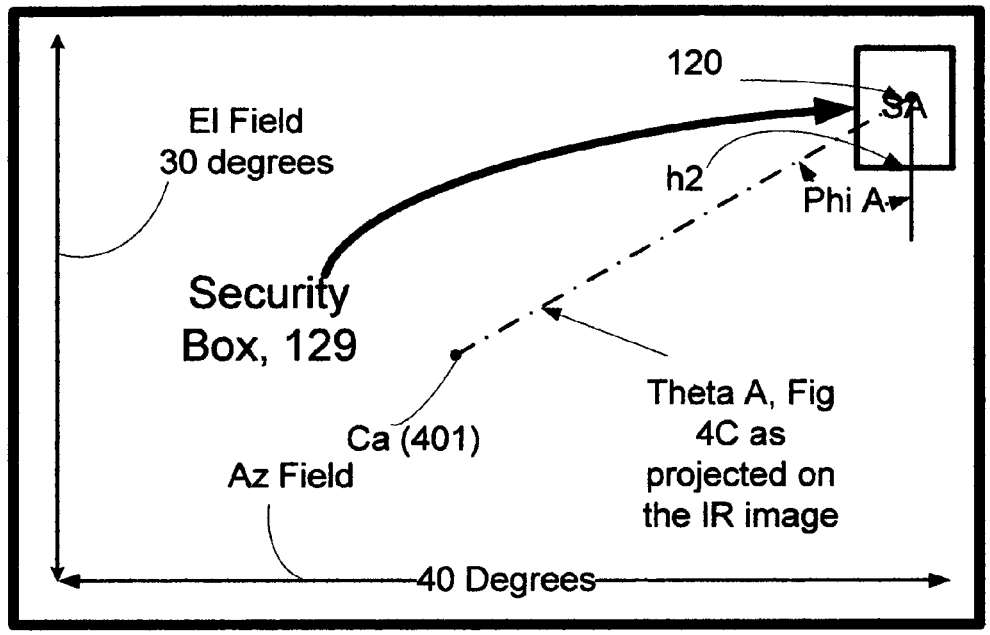
Figure 12B:
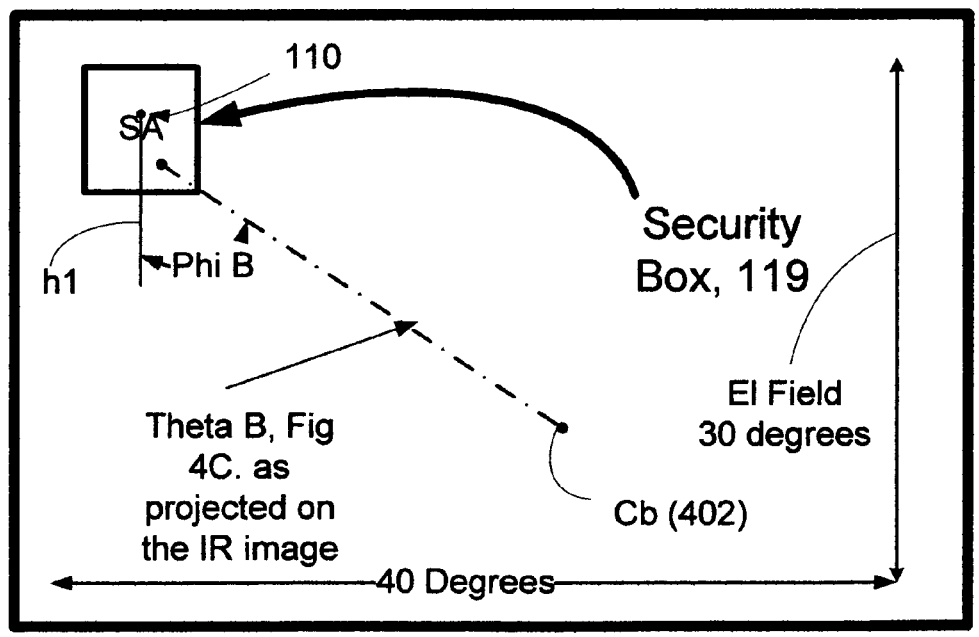

FIG. 6 is a block diagram of the central computer 174, the database 150, and example simultaneous processing FIG. 1, 170, of N security sites 144;

FIGS. 7A-B are IR image field of view (FOV) representations of SA #1 and SA #2;

FIG. 8 is a block diagram illustrating a data structure used for storing information in the database in accordance with FIG. 3;

FIGS. 9A-B contain views depicting an example surveillance area, and FIG. 9B depicts various paths that an example object 111 travels for illustration of a security zone violation;

FIG. 10 depicts an example User Menu called a Site Set-up menu for Target and Threat selections 160 of FIG. 1;

FIG. 11 is a flowchart showing an example alert protocol including user notification 180 of FIG. 1;

FIGS. 12A-B are IR image FOVs of SA #1 and SA #2 depicting the use of security boxes 119 and 129.

DESCRIPTION

This description begins with definitions of terminology that will provide a foundation for discussing many alternative preferred embodiments of the present invention.

DEFINITIONS

Behavioral Algorithms (BA)—The BA consists of the following algorithms: Stalking, Loitering, Lie in wait, Mandown, and others defined as threat characteristics which can be developed for each area based upon knowledge of the particular threat. If the threat at a given site takes a known and predictable form, the present invention can use real time target information defined by the user and installed in the threat definition file to meet user's particular needs.

Central Computer—used interchangeably with microprocessor. Alternative embodiments contemplated by the present invention could place the "central computer" anywhere within its data communications network, for example in a SA, at a separate location than the user site, on a PC within the office of the user site, etc.

Data Communications—can be accomplished by any of the number of commercially available methods including wireless, DSL/cable, phone lines, etc. Each method is equivalent in function. For purposes of illustration a wireless preferred embodiment will be used herein. See FIG. 2. Note that reference is made to simultaneous processing of input data transmissions of the SAs to the central computer, and this is not to be confused with data packaging that occurs in various data communications protocols like TCP/IP for instance. What is meant by simultaneous, therefore, in the context of data communications, is that all SAs may be transmitting their data packets at the same time, not that each single set of input data of each SA is transmitted by itself. Rather, the executive program on the central computer identifies which sets input data items from the various SAs correspond to one another based on their common date timestamps and customer account IDs. User and customer are synonymous.

Detected Object 111 of FIG. 9B—is defined as an object that has satisfied the moving object detection requirements of the user. An object is identified within the SA as Object A (A=1, 2, 3, . . . N) in this example, which indicates that more than one object can be detected concurrently. Once a moving object, lets say Object A, is detected, it no longer needs to move to continue to be tracked, because the image is segmented.

Event—when an object is classified as a Target of Interest, the classified target has been selected by the user as defined in the Target and Threat Definition Menu of FIG. 10. An Event declaration instructs the ISS system to record time history and single image records of the Target of Interest without declaring an alert. See FIG. 11.

Executive Program—this term is synonymous with application program or computer program and parts of it can run on any and every microprocessor in an ISS configuration. The executive program can execute on any standard microprocessor in the data communications network and provides the operational control of each SA to ensure the correct operation of each SA. The Executive program provides the commands to the IRC to: normal operation, perform internal non-uniformity correction (NUC), globe scene balance and operational integrity. The SA monitors internal power to ensure that the system can operate using battery power. If the external power is interrupted, the SA will send a malfunction message indicating loss of power that can be an internal equipment malfunction or an external assault that disables the SA.

False Alarm Processing (FAP) 160 of FIG. 1 process under control of the Executive Program used to identify and store IR signatures classified as false alarms identified by the user during initial system setup.

Image Processor or 2D Processor or Two Dimensional Image Processor (2DIP): This is a software program residing in the SA microprocessor 113 of FIG. 2. It is a common commercial function that provides real time image processing providing contrast enhancement, object segmentation, and motion detection in a FOV having moving objects. Once an object has been segmented, it no longer needs to continue to move to continue to be tracked, and target information by the SA will continue to be sent to the central computer. The present invention adapts this common and standard software component to accept target information and to provide the real time video image processing to detect one or more moving objects in the Image Scene.

Figure 2:
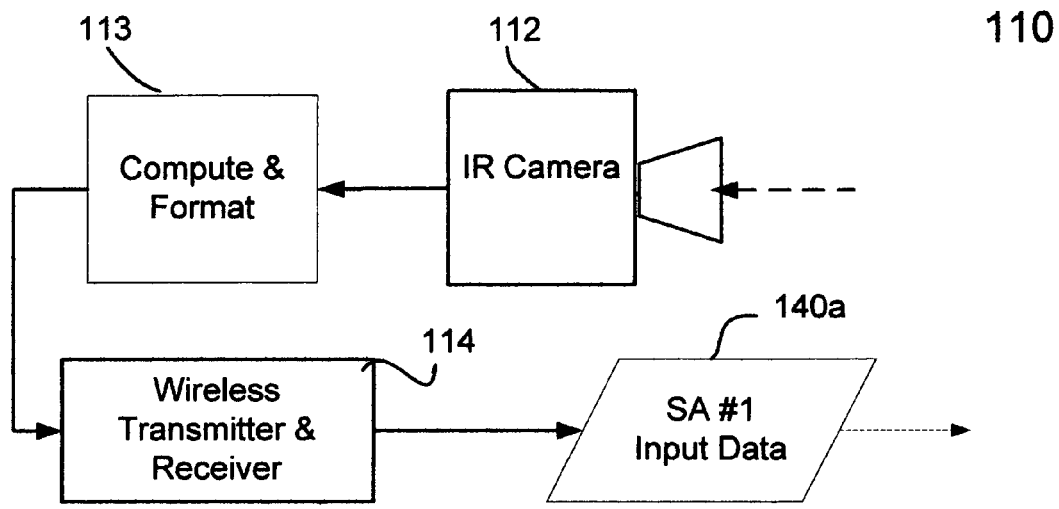
FIG. 2 is a block diagram of the example first sensor assembly (SA #1) 110 of FIG. 1.

Image Scene—the infrared (IR) real time video image that is produced by the IR camera 112 of FIG. 2 in a sensor assembly (SA) 110 of FIG. 1 as shown in FIGS. 7A-B, 12A-B.

IR Camera—an IRC is a component common to all applications that provides a real time IR image of the surveillance area to collect and process the information. The IRC is a staring focal plane array operating at room temperature. The IRC performs periodic automatic internal maintenance consisting of non-uniformity detector gain and offset correction, neighborhood pixel averaging to eliminate dead or out of specification detectors. The output of the IRC is both analog RS-170 composite video for real time display and a digital data bus for digital pixel data. The IRC is adapted to perform common scene balancing with a second IRC to facilitate the balancing of the IR data desirable for the common object processing and correlation performed by the present invention. The balancing of the common IR scenes produces a radiometer capability, where the radiometric information is to a common relative base, not in absolute units of electromagnetic units of emission.

Infrared Security System (ISS)—another term used interchangeably with "the present invention".

Loitering—the length of time a target remains in the Surveillance security area defines loitering. The track file by using the precise features of the invention can maintain the accurate track of individual targets in a target rich environment. The user selects a maximum time allowed in the surveillance area before declaring an alarm.

Microprocessor (synonymous with central computer and image processor) 113 of FIG. 2, 174 of FIG. 6—the Image Processor provides several functions including 2DIP, processing SA Input Data, and Moving Object Detection (an image processing algorithm that detects moving objects by a three step process of: Scene Enhancement, Scene segmentation, and Object relative movement over time).

Lying-in-wait (LIW)—defined as a target remaining in a stationary position for a period of time selected by the user.

Man-down—the present invention provides the target aspect as well as size. In some security applications a true target may assume a prone position would be sufficient reason to sound an alarm. This could be a sickness or injury, all possibly sufficient reasons to sound an alarm.

Object Relative Motion—is calculated by observing the segmented object over a period of time comprising many frames of the Image Scene. The determination of movement can be made with as few as 8 frames since each frame is approximately 1/60 of a second or as many as several hundred frames over a period of minutes.

Optical A-Focal—establishes the SA FOV by its focal length. The OAF comes in different focal lengths to best accommodate the requirements of the security site (size of area, distance between observation points (SAs), targets of interest, etc). The OAF images the external spatial field on to the IRC focal plane. A-Focal lens typically have small error between the actual spatial angle and the imaged angle on the focal plane. These errors are asymmetrical and polar. A table look up is used to correct the angular positional information of detected objects. The present invention will use a 30 degree (vertical) by 40 degree (horizontal) FOV; see FIGS. 7A-B.

Scene Enhancement—a process where a percentage of the whitest picture elements (pixels) are assigned a binary value of "1", and the balance is given a binary value of "0".

Scene Segmentation—is accomplished by identifying all groups of pixels that contain all "1"'s, enclosed by all "0"s, so the object is separated or segmented from the background.

Security Box—an area designated by FOV coordinates as shown in FIGS. 12A-B for protection of a SA itself.

Sensor Assembly—the SA consists of base components and optional components. See FIG. 2. The base components are: an IR Camera, an image processor executing its programs on a microprocessor, and a Wireless Transmitter and Receiver (WT/R). Other elements of the SA not shown are a power supply including a battery; the WT/R could be replaced with a fiber optics transmitter/receiver FOT/R, Coaxial Data Bus, satellite communications (SATcom), or a MMW/Microwave communications link. The SA in some applications may incorporate a Global Positioning System (GPS) receiver, and Solar Panels. Solar panels are required where electrical power is not available. GPS may be incorporated to provide automatic calculations for a rapid deployment set-up of ISS. The GPS may be a separate portable unit used only for set-up and calibration or an element of the SA.

SA Input Data—the digital data that describes a detected object into a standard format required by the Central Computer. The SA Input Data identifies time, site and sensor ID, and Object Data. See FIG. 5 for data and FIG. 4C for definitions. The location is defined as a specific security site and surveillance security area. The time code is a universal synchronized between the SAs and on the same time standard for the Central Computer. The quantitative data of the object consists of the center of the object with respect to the centerline of the IRC FOV. See FIG. 7. Center point being (0, 0) degrees. Orientation is vertical is the y direction and horizontal is the x direction. The angles x and y are in degrees. See FIG. 5. The other terms are the spatial area of the object, the object Aspect and the average Apparent Intensity of the Object (AIO). All input data is identified for each SA by the SA's unique ID number. The Object is defined by a number of discrete Pixels on the IRC image plane. These Pixels that make up the Object are summed and averaged, and that value is used.

Stalking—The movement of the target over time that results in loss of tracking by one or more SAs at the site may indicate the target is moving from one concealed position to another. The present invention uses the physical characteristics of the target (i.e. actual size and inherent thermal radiation) to maintain track by a single SA or to re-acquire the target by matching the old target with a new target in a location and time window. The user selects loss of track rate as the criteria for declaring an alert.

Surveillance Security Area (SCA)—the Surveillance Area is defined by the projection of the IR camera's field-of-view (FOV) on to the area designated for surveillance. See FIG. 9A. This area is defined by two regions, Dual FOV and Single FOV. The Dual FOV is the region of the two IR Cameras' over-lap, designated "Zone A" in FIG. 9A. Full 3D calculations cannot be accomplished until the object enters Zone A. See FIG. 9B. Once the object has entered this region, the central computer receives information from both SA #1 and SA #2 to perform target classification. Once an object has entered Zone A and has been classified as a target, the target is tracked in Zones A, B, and C, whether it is moving or stationary.

Target—is defined as a detected object 111 of FIG. 9B that meets a specific size criterion FIG. 10 and is classified as within a user selected target group.

Target of Interest—a true target is defined as an object that meets the specific size criterion, and or other specified criteria and as such is designated by the Target Definition_File as a potential Threat FIG. 10. A true target contains 100% of the designated threat as well and could contain other objects that meet the established criteria. The user may select a tighter or more precise size criterion to reduce the false target classification at the risk of missing a true target.

Target Definition File (TDF)—The TDF is input to the central computer either by an application program running on a desktop computer, or through an Internet application, with a unique customer account access code for the specific user site. Each security site uses a Target and Threat Definition Menu, FIG. 10, which allows the user to tailor the ISS to the it's specific requirements. The user can identify multiple targets, different threat criterion, and different levels of response for each target identified. As required, the user may modify criteria or add new unique targets to meets the needs of each security site.

Target Track File (TTF)—when a true target has been established the true target is assigned to the surveillance area's Target Track file. The TTF tracks the target's position in the surveillance area for as long as the target can be tracked. The present invention maintains track of the target, which allows for sensor data drop outs, single sensor tracking, and re-establishing target identification using precise target information of actual size, location and thermal contrast. Behavioral Algorithms use target position over time and target characteristics to determine which, if any, alert should apply.

Threat—defined as a True Target that meets the Threat Definition.

Threat Definition (TD)—the TD, or IR signatures classified as threats, is input to the Central Computer at system setup resulting in file 160b of FIG. 1 and establishes the criteria required to determine 170 if a true target is a threat. An Alert is declared if the true target meets or exceeds the threat definition. See FIG. 11. The criterion for an alert is established by the user by filling in the appropriate information as shown in FIG. 10. The detection of a true target in all or some portion of the surveillance area as specified is sufficient to declare either a full Alert or an Event to record for future review. An alert may also be determined by the Target Track_File. The TTF observes the target over time as long as the target remains in the surveillance area. Behavioral characteristics detected over time may be used to identify threats.

Threat Image Processing (TIP) 180 of FIG. 1—The SA receives a command from the Central Computer requesting that real time images be formatted and transmitted to the user by an SA. The transmission of processed images depends upon the bandwidth of the data link and the resolution of the display system at the command and control site. See FIG. 11. The lowest bandwidth and least complex of the threat display is the cell-phone connection with Text Paging. A slightly higher complexity level is the same cell-phone with still image display capability. And an even more complex level is cell-phone video.

Three or More IR Cameras—the present invention may require the use of three or more SAs to cover a surveillance area. In this case, each pair of SAs could form a system, or groups of SAs can be situated to monitor vast areas in length or which may be circuitous in shape. Any combination of pairs, groups, or indeed, individual SAs in a configuration are contemplated. Therefore a Tri-SA net would consist of 3 or more pair of SAs. The need for more than one IR camera pair is a requirement of redundancy for many critical applications. A preferred embodiment further contemplated by the present invention involves securing a surveillance area along a long winding fence, over harsh terrain, or under conditions of excessive clutter from large fixed objects.

3D Algorithm Processing (3DAP)—The present invention processes input data 140 of FIG. 1 to produce accurate information on target location, target size, and target thermal characteristics. The 3DAP algorithms consist of using the site harmonization information 160 of FIG. 1 160a of FIG. 3, and real time target information to compute 170 of FIG. 1, 170a of FIG. 3, target location, target size, and target thermal characteristics creating computed IR signatures. See FIG. 4A, 4B, 4C, FIG. 5, and FIG. 7. There are three basic algorithms that are used. Each algorithm has properties that provide flexibility as a function of variables at the site and associated with the target. Therefore, the 3DAP processing employs all three of the processing methods. Based upon the prevailing conditions, and the information obtained during processing, the relative weight of the computed information can be re-distributed to optimize the solution. The 3 independent algorithm solutions are: (a) Isosceles Triangle (IT), (b) Direction Cosine Vector Transformation (DCVT), and (c) Finite Dimensional Analysis (FDA):

(a) The IT method uses a triangle formed by the two SAs (two points) and the target third point). See FIG. 4A.

Figure 4A:
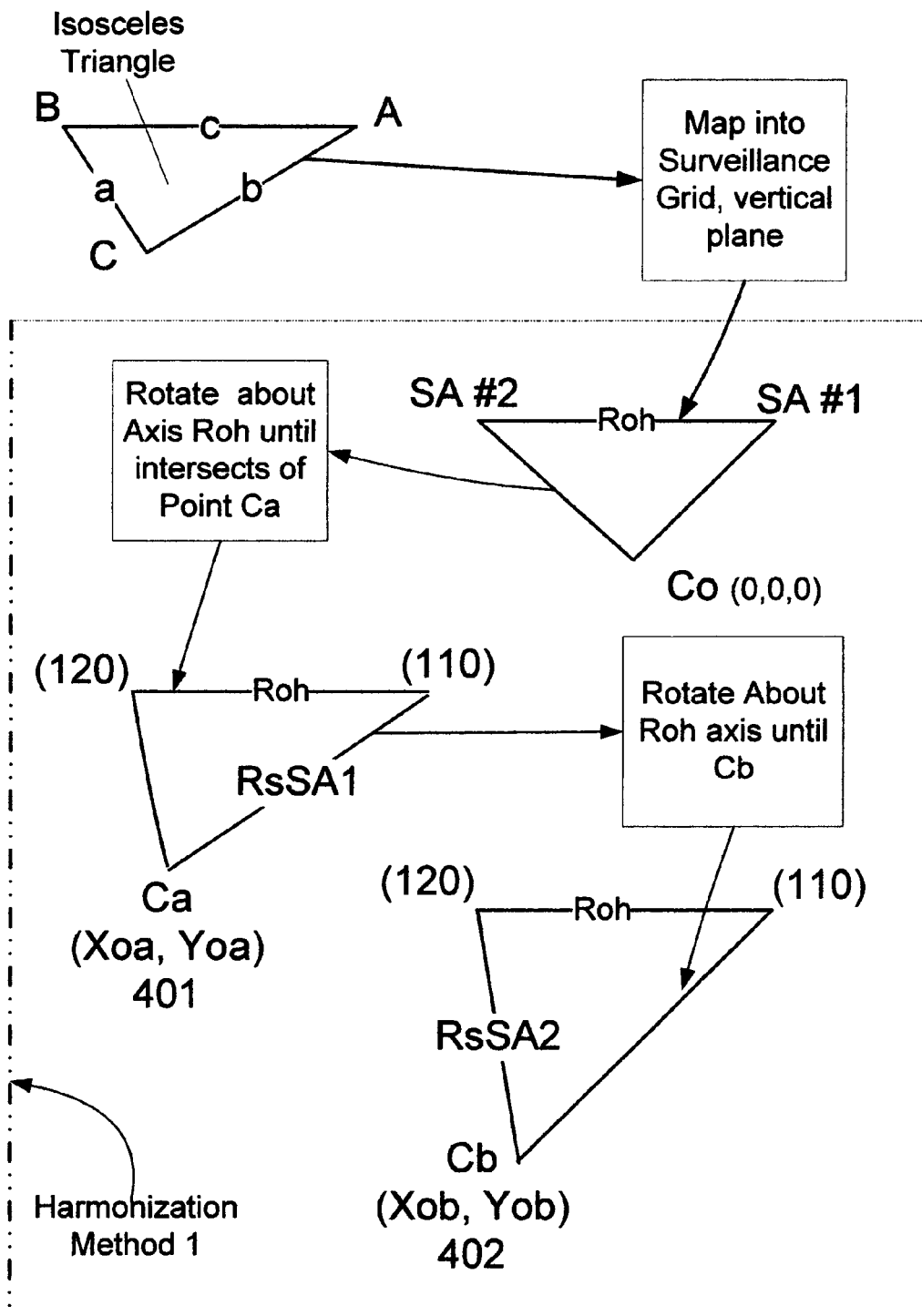
FIG. 4A is a diagram of an example Isosceles triangle of the present invention.
Figure 4C:
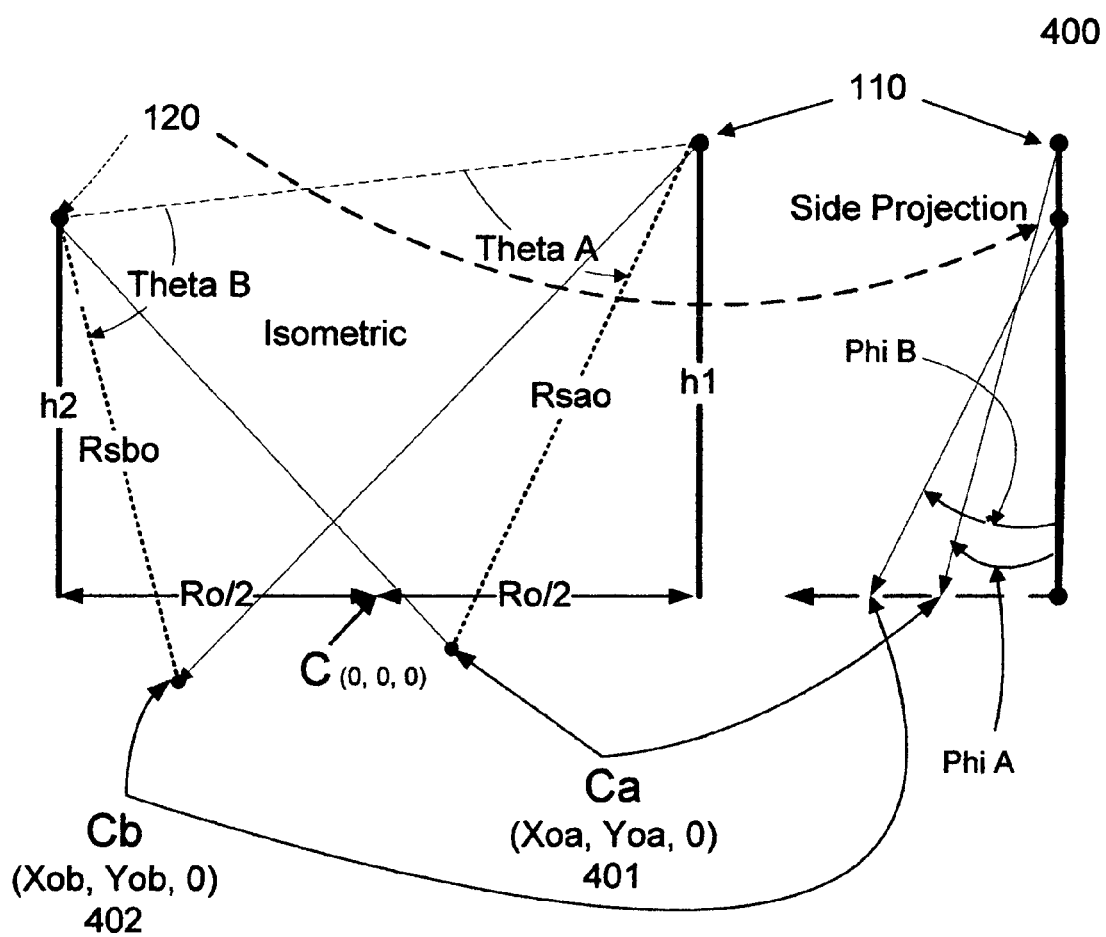
FIG. 4C is an example front isometric and planar side view of SA #1, SA #2 120 of FIG. 1, angle, and position information specific to the user security site.

(b) The DCVT method utilizes the slant range to the target Rs FIG. 4C and the dependent variable. The Rs is resolved through the SA polar angles to yield the three orthogonal vectors Xo, Yo, and Zo. Since Zo is equal to the height of SA (h) above ground, the solutions to all of the vectors can be computed by multiplying (h/Zo). This allows the slant range to the target to be computed for both Sensor assemblies.

Figure 4D:
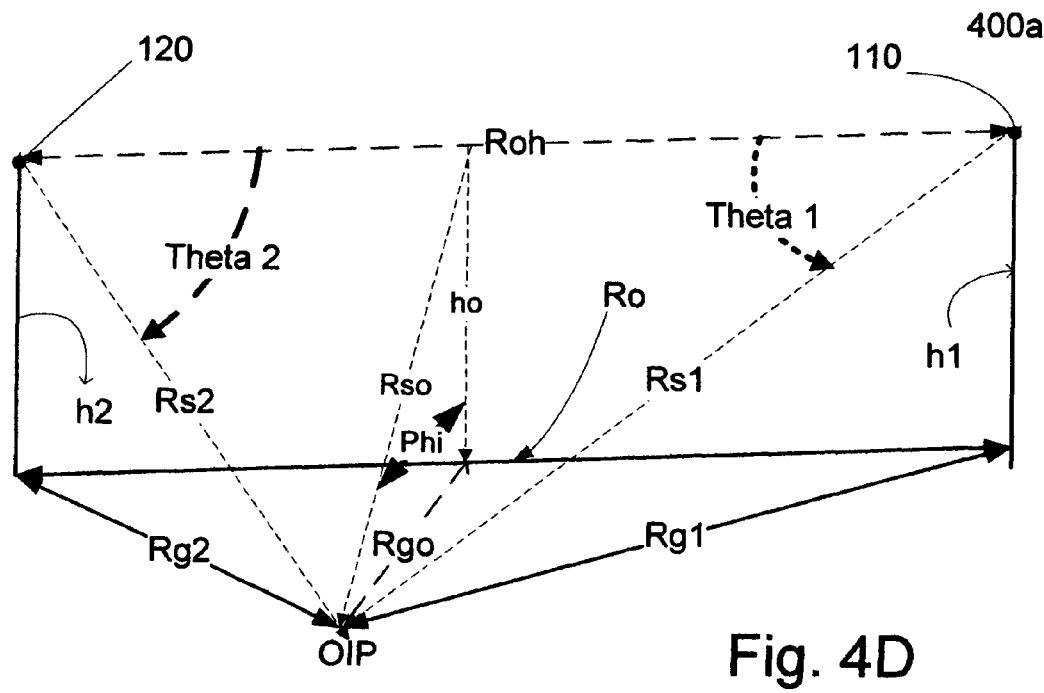
FIG. 4D is an example isometric drawing of an Offset Initialization Point (OIP), alternate SA harmonization method.
Figure 4E:
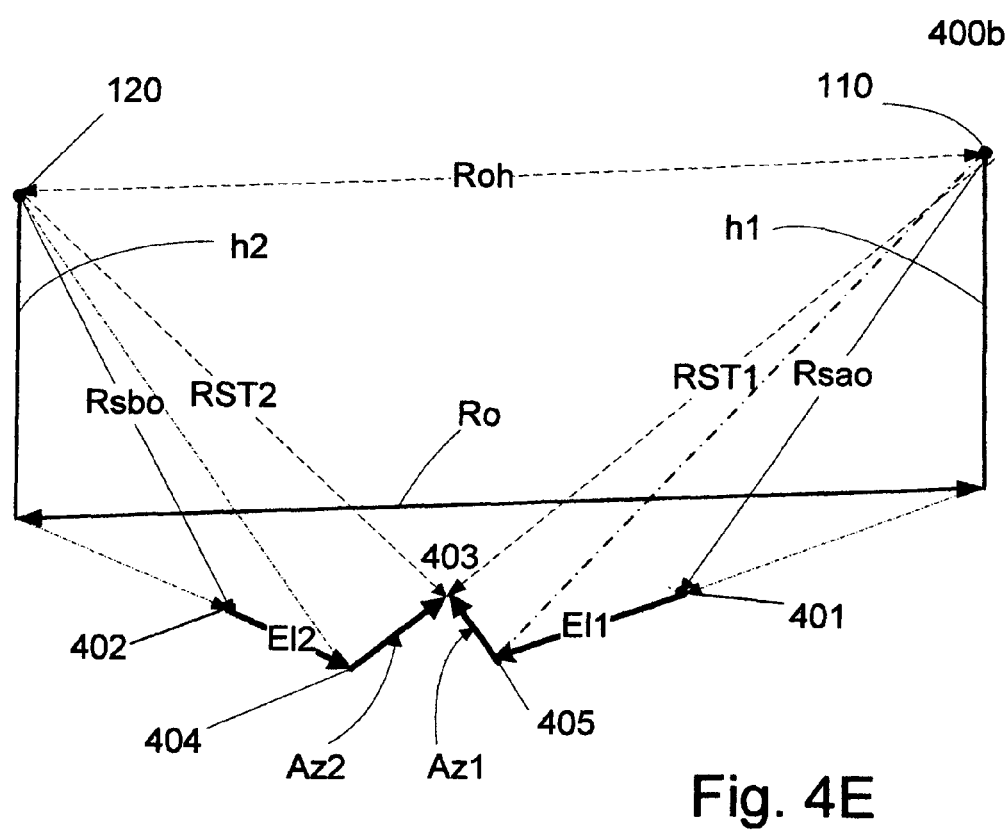
FIG. 4E is an example isometric drawing that depicts an azimuth angle and elevation angle required to compute a target's physical location.

(c) FDA is used where a geometric solid is computed based upon the volume subtended by the target angle to the SA. This cone shaped volume has a centerline axis defined by the polar angles at the SA (Theta and Phi). The volume in object space is compared to the volume produced by the second SA looking at the same target. The FDA algorithm convolves the two all-possible 3D solutions into the infinite elements that occupy the space. The resulting composite, is a three dimensional image of the target, that is located on the common grid. IT, DCVT and the FDA methods all yield the same target detection information in a imaginary perfect environment free of data errors and background noise. Each method is sensitive to certain kinds of systemic errors, and each method has relative immunity to other errors. The strong and weak points of the different methods are: DCVT is very adept at sorting out a target rich environment. The DCVT process allows matching of a large number of moving objects from the two SAs. The projection of the data from the height vector is subject to large errors resulting from small errors in the height vector or the actual target incident angle. The incident angle is the angle between the target and the horizon. The best closed-form solution is IT, where the error sources are minimized. This property results from an accurate knowledge of the Ro range component. See FIG. 4C. Errors in target size and location are very small. The solution is best with small targets of finite depth (i.e. people as opposed to cars or trucks). The IT method is used as the preferred method for setting up the surveillance grid because it internally identifies the two points of the isosceles triangle by inspection of the images (i.e. SA #1 IRC can see SA #2 in its FOV, and the IRC of SA #2 can see SA #1 in its FOV establishing the reference points for the isosceles triangle). If the area that requires surveillance is sufficiently displaced from the line between SA #1 and SA #2, this method cannot be used. In that case an Offset Initialization Point (OIP) is used to establish the two points of the isosceles triangle. The distance between the bases of SA #1, SA #2 and the OIP is measured. From these two distances and Ro one can apply the Law of Cosines to compute the angular position of SA #2 in the IR image of SA #1, and the angular position of SA #1 in the IR image of SA #2. This allows any point in the IR image FOV of SA #2 to be described by two polar angles (Theta2 also referred to as ThetaB, which is a second angle theta of SA #2, and Phi2 also referred to as PhiB, which is a second angle phi of SA #2, of FIGS. 4C-E) with respect to the actual spatial position of SA #1. The same information for Theta1 also referred to as ThetaA (a first angle theta of SA #1) and Phi1 also referred to as PhiA (a first angle Phi of SA #1) of FIGS. 4C-E are available from SA #2. Thus, the Law of Sines can be used in the same way as above to compute very accurate slant vectors, RS1 and RS2. See FIGS. 4A-C. Because SA #1 (110) & SA #2 (120) lie in the same plane defined by cardinal points (120), (110), and OIP in FIG. 4D, Phi is the same for both SAs. Once the OIP location is established, the Azimuth & Elevation angles of the OIP with respect to the centerline FOV point Ca (401) for SA #1 (110) and centerline FOV point Cb (402) for SA #2 (120) can be used to compute the grid locations (Xoa, Yoa) for SA #1 (110) & (Xob, Yob) for SA #2 (120). The point (403) in FIG. 14 is an arbitrary common reference point that has been used to show how Harmonization can be performed using the polar angles from SA #1 and SA #2, or using the target's Azimuth & Elevation angles (defined in FIGS. 7A-B) to compute target grid location. The FDA method is particularly useful when the target has significant depth. The SA cameras tend to see mostly the ends of a target. The IT method assumes zero width (or a negligibly small width), unless additional information is provided. The FDA produces volume and shape information that could be used to match against known targets. The DCVT method yields the depth of the target directly, but is subject to error propagation. Where the data from the FDA and DCVT suggests the target may have significant depth and it can be assumed the target is on a horizontal plane with the base of the sensor, the IT method can also be used to introduce a target width vector W. The W estimate can be determined by reducing the Ro vector by the value W until the RS1 and RS2 vector coincide with the horizontal plane. In general, the most accurate measurement is produced by the IT method and shall be used herein.

DETAILED DESCRIPTION OF THE PREFERRED EMBODIMENTS

In the description that follows, like parts are marked throughout the specification and drawings with the same reference numerals, respectively. In some instances, proportions have been exaggerated and are not to scale in order to more clearly depict certain features of the invention. In particular the height dimensions h1 and h2 are exaggerated in FIGS. 4C-E, 7A-B and 12A-B.

A preferred embodiment of the present invention, hereafter called ISS, is depicted in FIG. 1 and could include any number of SAs or pairs of SAs, however, a single pair installation will be described herein for simplicity. FIG. 1 shows the ISS system in its most comprehensive form. Real time moving object information is gathered by the SAs 110 and 120 of FIG. 1. This data FIG. 2, 140a came from the detected image from an IR camera 112 and its image processor 113, then was transmitted 114 to a central computer FIG. 6, 174 and edited by an executive program FIG. 1, 170 and stored in the database 150 of FIGS. 1, 3, 6, 8. At the time that ISS was installed at the security site, information was manually input to the database, preferably via the Internet. This installation and operational set-up, or installation, is determined by the user through its selections from a User Menu for Target and Threat selections 160 under control or the executive program. It includes site harmonization data FIG. 3, 160a, target and threat data 160b, the alert protocol selected 160c, and false alarm data 160d, if any. The ISS executive program 170 computes IR signatures from real time input data FIG. 1, FIG. 3, 140, 142 and optionally stores the computed IR signature data 170a into the database if it matches pre-defined IR signatures classified as threats 160b, and does not match IR signatures classified as false alarms 160d and any other user criteria that may be required for storing computed IR signatures. If a threat is detected, the ISS system notifies the User 180 FIG. 1, FIG. 11 in accordance with alert protocol, 160c of FIG. 3, specified. The operation depicted by FIG. 1 shows the essential flow of data from sensor to an alert status without regard to architecture or allocation of functions to a particular location or the method of transmitting data by form or content. Any embodiment can depict these items in terms of specific forms and configurations that are defined by the user, but they represent identical functionality of ISS. FIG. 6 depicts example reference numerals 144a, 144b, 144c, 144N, 160N, 164N and 174N that represent a preferred central computer complex supporting any number of customer configurations. These are based on SA paired configurations, however another embodiment ISS contemplates many SAs making up a group focused on a common surveillance area whereupon, for example, third, fourth and fifth SAs all transmit their sets of input data having a third, fourth and fifth azimuth and elevation angles, etc., along with corresponding SA harmonization among the group. In such a preferred embodiment of ISS, the number of SAs making up a group is unlimited, based on user requirements.

FIG. 4A provides a progressive view of an isosceles triangle that is first mapped into the surveillance area, then it is orientated to define one SA location, and then a second SA location. FIG. 4A defines the coordinate points of Co (see FIG. 4A), Ca (see FIG. 4E, 401, FIG. 12A), and Cb (see FIG. 4E, 402, FIG. 12B). FIG. 4B provides the definition of the terms depicted in FIG. 4A. These terms are SA #1 110, SA #2 120, Co, RsSA1, Ca 401, RsSA2, Cb 402 and Roh. These terms are defined in spatial terms, and than translated into x, y, z surveillance grid positions. FIG. 4C depicts a front view, isometric perspective and a planar side view. Previously defined terms are shown for reference, and additional terms for Phi A and Phi B, as well as h1 and h2 are shown. The heights $h_1$ and $h_2$ are arbitrary. The elevation of SA #1 and SA #2 allows a FOV that "sees" over ground clutter, but is not essential to the invention. The terms Phi A and Phi B, when coupled with Theta A and Theta B, define the positions of Ca 401 and Cb 402. The last term introduced is Ro, the range between SA #1 110 and SA #2 120 as measured at the base of h1 and h2. The term Roh is the Ro vector corrected by any difference between h1 and h2. The correction equation is Roh=$((h1-h2)^2+Ro^2)^{1/2}$.

The relationship between elements of ISS is depicted in Table 4F. ISS utilizes several different coordinate reference frames. The coordinate reference frames are: Surveillance Site (3D) rectangular, Sensor Assembly (2D) polar angle coordinates, and Target Coordinates (2D) rectangular angle. The table of FIG. 4F identifies various elements of the invention and defines their relationship in the different coordinate systems. Elements are cross-referenced by name, symbol used, identifier, and relationship to ISS. The elements defined are: fixed geometry (SA #1 110, SA #2 120, SA poles h1 and h2), distance between SA poles (Ro) and distance between SA #1 and SA #2, (Roh); Computed Reference points: Ca 401, Cb 402, and target location, T(x, y, z), FIG. 4E, 403; and the three forms of surveillance site harmonization: Method 1, Method 2, and Method 3. The computations of Ca and Cb are based on principles of isosceles triangles as illustrated in FIG. 4A.

FIG. 2 is a block diagram of the example first sensor assembly (SA #1) 110 of FIG. 1. It is representative of all SAs demonstrating that each SA consists of three main components; an IR Camera 112 including an optical lens, a microprocessor 113, and a wireless transmitter/receiver 114 that includes an antenna. Additional components in the SA assembly that are not shown or may be considered as optional and ancillary to the invention are: a solar panel, a battery, GPS receiver, a database 150, and an internal power supply. This configuration 110 consists of the full compliment of components required to define the ISS invention. The solar panel is not needed if commercial power is available. The battery is required to retain full capability if power is interrupted. Other forms of connectivity could replace the wireless transmitter/receiver 114. These alternatives include, but are not limited to, coaxial wiring, cabling, fiber optics, millimeter wave data links, or other communication networks. The form and function of the invention is independent of the connectivity media, although certain claims are made based upon unique architecture associated with the distributed system processors.

The IR camera (IRC) and lens on an example SA FIG. 2 comprises wide FOV optics producing a rectangular FOV of 30 degrees vertical and 40 degrees horizontal. It could be any FOV optics commercially available. The FOV is used to establish the surveillance area grid for ISS. The lens of the IRC 112 can be replaced with one of a wider FOV (shorter range) or narrower FOV (longer range) to fit the desired surveillance area. The focal length of the lens varies according to the FOV desired. ISS uses different lenses as required to provide different surveillance areas and resolution tailored for each security application.

The SA component of FIG. 2 is aligned to cover the horizontal ground plane as shown in FIGS. 9A-B. The positioning of each of the SAs 110 and 120 are not critical, as long as the desired surveillance region is covered by each of the SA units. SA #1 110 is rotated about its vertical axis and tilted down from the horizon. This retains the optimum image orientation as shown in FIGS. 7A-B. A TV cathode ray tube (CRT) or flat screen monitor can be used to produce a display of the SA #1 FOV to ensure the optimum alignment. Any type of monitor is contemplated by ISS for SA calibration. The monitor, itself, is only used in system setup and diagnostics and is not considered part of the present invention. SA #2 120 is visible in the upper right hand corner of the IR image FIG. 7A produced by SA #1 110. The angular position of SA#1 is not critical to the optimum installation. This orientation is desirable to maximize the ground area covered, provide self-protection for ISS, and for ease of installation.

SA #2 120 is positioned like SA #1 110 except in this case, as shown in FIG. 7B, the SA #2 FOV has SA #1 110 in the upper left hand corner of the displayed image. A monitor is again used to ensure proper location. This angular position is achieved by rotating SA #2 and tilting its IRC downward from the horizon in similar fashion to that of SA #1.

The orientation of the FOVs of FIGS. 7A-B of SA #1 and SA #2, respectively, to see their counterpart SA is desirable for operational reasons, but it is not required. An Offset Initialization Point (OIP) is an alternative. The OIP uses a common reference point visible by SA #1 110 and SA #2 120 as a baseline.

When each SA in an SA pair 110 and 120 are positioned as depicted by FIGS. 7A-B, the overlapping common FOV is projected onto the horizontal plane as shown in FIGS. 9A-B. The common area is called "Zone A". The FOV of SA #1 FIG. 7A and of SA #2 FIG. 7B are shown with the center of the FOVs designated as Ca for SA #1 and Cb for SA #2. See FIGS. 4A-C, 7A-B, 12A-B. These points, for Ca and Cb establish the grid coordinates of (Xoa, Yoa) for Ca and (Xob, Yob) for Cb. These are the grid location coordinate reference points for computing target locations with respect to the centerline of the SA #1 and SA #2 FOVs, see FIGS. 7A-B.

At this point we have established the reference grid that locates the cardinal points of the two isosceles triangles defined in FIG. 4A, as (A, B, and Ca) and (A, B, and Cb). "A" symbolizing an SA #1 110 and B symbolizing an SA #2 120. Ca is the centerline of the SA #1 FOV FIG. 7A, and Cb is the centerline of the SA #2 FOV FIG. 7B. The computation of an object located in the surveillance field Zone A, FIG. 9A consists of locating the object in the FOV of SA #1 and in the FOV of SA #2. The depiction of the Azimuth and Elevation angles for SA #1 110 are shown in FIG. 7A. For SA #1 110 the Az1 azimuth angle is defined as the angle formed by imaginary lines connecting points 401 and SA #1, 110, and 405 and 110 (expressed 401-110-405 where 110 is the origin), and the E11 elevation angle is expressed similarly as the angle formed by points 405-110-403. For SA #2 120, the Az2 azimuth angle is defined as the angle formed by points 402-120-404, and the E12 elevation angle is formed by points 404-120-403. The central computer utilizes these vectors to compute the position of the target 403 and the slant range RST2 for SA #2 120 and the slant range RST1 for SA #1 110 as shown in FIG. 4E. An object so located in each respective FOV is identified generically by an azimuth angle Az and an elevation angle E1 as defined in FIGS. 7A-B for each SA. The angular information Az and E1 for each SA is transmitted as input data 140 and 142 to the central computer 174. The central computer transforms the Az and E1 vectors into the coordinate reference frame defined by the vector Rsao for SA #1 110 and the Az and E1 vectors into the coordinate reference frame defined by the vector Rsbo for SA #2 120. See FIGS. 4C, E. This transformation provides the specific location of the target point in the surveillance grid and allows the direct calculation of the slant ranges between the Target and each of the SAs.

To describe the operation of ISS in a preferred embodiment, consider an example Object A 111 moving from left to right along Path 1 as shown in the horizontal plane of FIG. 9B starting at position labeled "Start". The surveillances area is defined by Zone A, Zone B, and Zone C as shown in FIGS. 9A-B. The object shown at its "Start" point FIG. 9B is first detected by SA #1 110 of FIG. 9B. SA #1 detects the object 111 FIG. 9B and computes 113 of FIG. 2 that the object is moving by the change in angular position with respect to the image scene background. SA #2 120 of FIG. 9B cannot yet "see" or detect Object A, because Object A is not within the FOV of the SA #2 IRC FIG. 7B.

Figure 5:
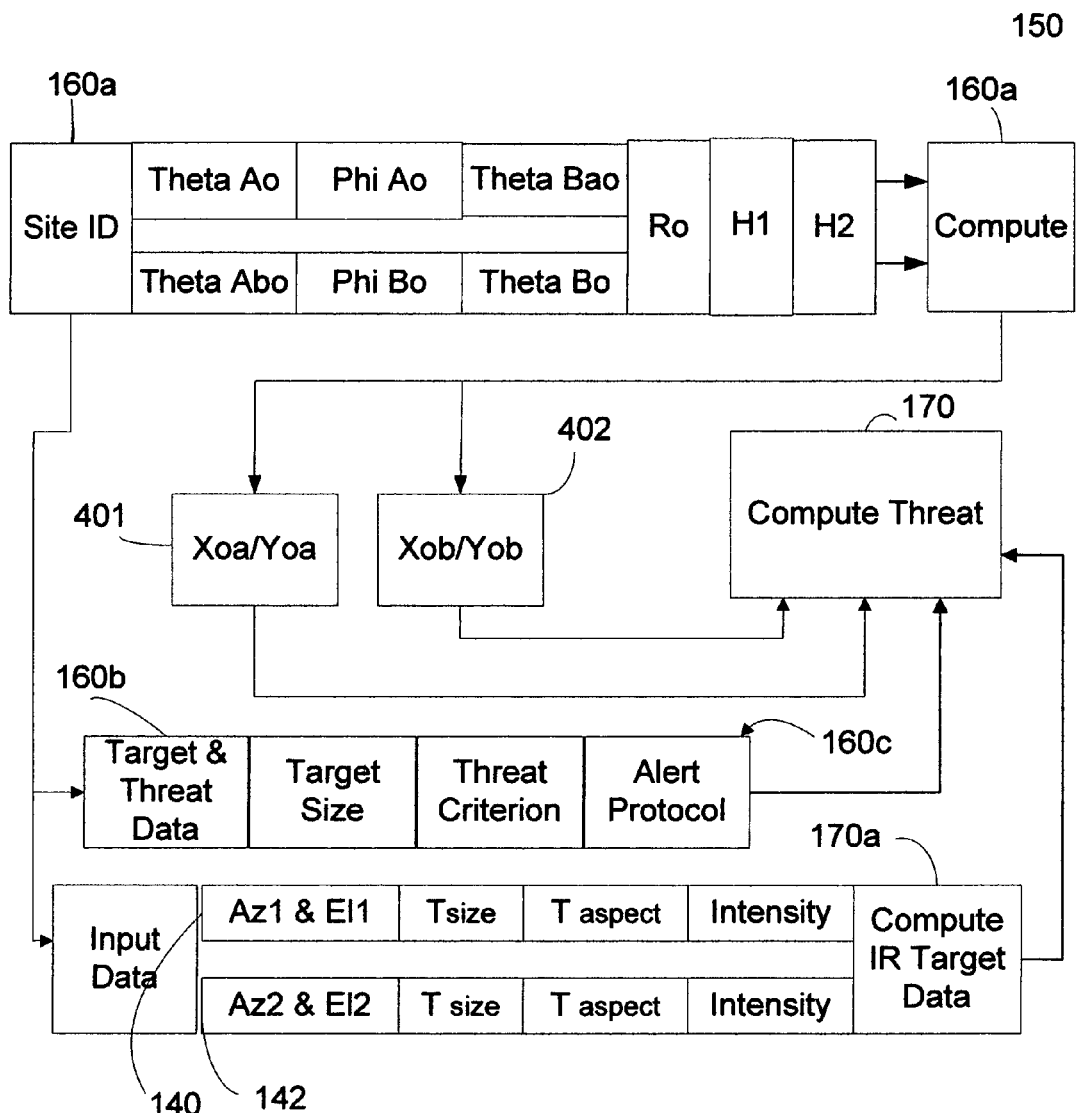
FIG. 5 is a block diagram of the database.

SA #1 110 from the initial detection of Object A computes 113 the position of Object A within the FOV of SA #1 FIG. 7A and transmits 114 of FIG. 2 the data 140a of FIG. 2 associated with the detection of Object A. The input data transmitted by SA #1 includes the following data as depicted in FIGS. 5, 7: two rectangular angles, Az1 and El1, the angular area of Object A, the vertical to horizontal aspect of Object A, and the apparent thermal intensity (or contrast) of Object A. The angles Az1 and El1 are as shown in FIGS. 5 and 7. This input data 140a can be computed, for example, approximately every quarter of a second and transmitted 114 to the central computer 174 of FIG. 6 either individually or in bulk (i.e. a packet or buffer of many seconds of accumulated computed sets of input data, depending on user requirements and how data is transmitted by the chosen data communications access method. The computation rate and whether input data is transmitted individually or in bulk can vary by application and are not essential to the preferred embodiment.

At this point in time, SA #2 has not detected Object A because it has been outside the SA #2 FOV FIG. 7B, and this will continue to be the case until Object A reaches Zone A as depicted in FIG. 9A. SA #2 can only see Object A if and when it enters Zone A. SA #2 performs the same contrast enhancement to background and motion detection FIG. 2, 113 as SA #1 previously had performed, and which SA #1 will continue to perform as it continues to detect and track Object A. Object A's data from SA #2 consists of the same information set as that of SA #1 FIG. 8, 140, 142 and is transmitted FIG. 2, 114 to an edit and store function of the executive program FIG. 1, 170 of the central computer FIG. 6, 174.

The object continues to move through Zone A FIG. 9B until it enters Zone B when Object A leaves the FOV of SA #1 FIG. 7A. However, it remains in the FOV of SA #2 FIG. 7B. SA #2 will continue to track the object in Zone C until it is no longer detectable. The detected object in Zone A essentially provides the database 150, FIGS. 1, 3, 5, 6 and 8 information on the target's specific characteristics 140 and 142 of FIGS. 5 and 8. This information allows an IR signature of an object that has been classified as an object of interest or target FIG. 10 to be computed 170a of FIG. 5 and tracked in the database. As soon as the object enters Zone A, ISS now has sufficient information from both SA #1 and SA #2 to perform a threat assessment utilizing the completed database 150 including all elements and processes that complete the database FIG. 5, 160a-c, 401, 402, 170, 170a, 140, 142. The information is processed by the central computer FIG. 6, 174 in accordance with the flow diagram of FIG. 11. Once an object has been classified as a target of interest as defined bye the user FIG. 10, the target is retained in the track file, and tracking is maintained in all Zones A, B, and C. Now the target will continue to be tracked by the executive program and the database whether or not it continues to move.

In this example the object travels from left to right, and the threat criteria was unspecified. If the criterion was the detection of the object anywhere, the threat alert would have been executed soon after the object entered Zone A, in probably less than 4 seconds. Our example included a second path, designated Path 2 in FIG. 9B. In this case a threat zone was defined as shown in FIG. 9B. This zone was defined and established by the user as part of the threat definition 160b, FIG. 5. The Threat Zone is defined by grid points with straight lines between adjacent grid points until the area is bounded as in FIG. 9B. For our example irregular shaped area, 5 (x, y) grid points uniquely define the zone.

For Path 2 FIG. 9B the object 111 enters Zone A, causing input data 140a, FIG. 2 to be transmitted 114 to the central computer 174, FIG. 6 to invoke the executive program 170a to compute IR signatures and compare them to those classified as threats 160b to recognize whether the object is a specific target of interest. The Target of Interest becomes a threat when the threat criteria has been met or exceeded FIG. 10. When a target of interest is declared (182), an Event is posted to the executive program to initiate tracking of the object and recording of the data (181). Image information is collected and stored as shown in FIG. 11 (181). An Event declaration (182) collects the same target data as a full alarm, but the user is not notified and no alert is declared. As the target of interest penetrates the Threat Zone as shown on FIG. 9B, an alert is declared (183), the user is notified, and a general alarm is sounded. The specifics of all of these items are pre-selected by the user 160 of FIGS. 1 and 160c of FIGS. 3 and 5 by the set-up menu contained in FIG. 10.

FIG. 2, 114 shows the ISS data transporter. For preferred embodiment illustration a commercial wireless system is disclosed which is compatible with all major mobile transporters. The commercial transporters use an industry standard configuration consisting of transmitter/receivers, servers, routers, and data ports. The present invention uses commercially available wireless transporters that can vary based on availability, economy of scale, site-specific security requirements and inter-operability between host servers, etc. The use of other transport mediums such as fiber optics, high-speed landlines, microwave, or point-to-point data communications mediums for any or all ISS system requirements are contemplated.

A single microprocessor, or a group of microprocessors, on the central computer of FIG. 6 perform(s) the computations for many individual security sites simultaneously. For the purposes of illustrating ISS normal operation, we have used as example a single site with a common processor 174 depicting the internal multiplexing between N number of individual security sites 144N.

The operation of ISS100, FIG. 1 is based upon establishing four common grid points of reference SA #1 (110), SA #2 (120), Ca and Cb FIGS. 4A-C. The determination of Ca for SA #1 and Cb for SA #2 are accomplished at the security site by simple measurements of the respective Ro distances between the horizontal bases of SA #1s and SA #2s and the height of SA #1s and SA #2s as shown in FIG. 4C.

The points Ca and Cb can be determined in many ways. (1) simple measurements in the FOV, (2) the use of common and known reference points in the SAs at the site, at the central computer site, or at the user's command and control location. All of the methods lead to a common definition of the security site as shown in FIG. 5. The common points of reference for SA #1 grid locations Xoa and Yoa, and SA #2 grid points Xob and Yob, are used to compute the location of any object in their respective FOV FIGS. 7A-B. This simple method is illustrated in FIG. 4A. The relationship between SA #1, SA

2 and the line of sight vectors 401 and 402 of FIGS. 4E and 5 that terminate at Ca and Cb are defined. The polar angles Theta and Phi are defined for each case, and along with the Ro, h1 and h2 specifications, permit the calculations of the Ca and Cb grid locations by the executive program on the central computer. This process is shown in FIG. 5 and provides that the Xoa/Yoa reference for SA #1 and Xob/Yob for SA #2 contain the correct values indicating optimum calibration and time coordination. The other harmonization method, OIP, uses a common reference point that is visible to both SA #1 and SA #2. Ground ranges must be known, and, by the law of cosines, the angles can be calculated.

A preferred embodiment of the present invention is a security system that can operate in a unique self-protection mode where each SA monitors another SA to detect against intrusion or assault on the security system. See FIGS. 12A-B. Because the distance between the two SAs in our example, Ro, is known, the size of objects detected at or near any SA can be calculated in actual feet or meters. The threat menu, FIG. 11, provides the user with the means to identify a specific area of the FOV for each SA as a Security Box that permits single SA operations for such limited purpose. See FIGS. 12A-B. The known slant range vectors FIGS. 4B-E enable ISS to fully operate in this narrowly defined region. All discrimination features of ISS remain in force, and the alert system works as defined. If the SA units were located on the roof of a building, the Security Boxes would be horizontal to cover the access area to the SA. The Security Box is sized and located at each security site to provide the desired protection.

The declaration of an alert consists of notifying the user FIG. 1, 180 and following the instruction of the alert protocol FIG. 5, 160c. FIG. 11 depicts the following sequential steps: (1) announce that one or more threats have been detected. 182; (2) the nature of the threat, if more than one criterion is used 183; (3) the precise location of the threat 113 FIGS. 2, 11; (4) an IR image of the threat in real time 184, 185, 187 and 188; (5) record and save the history of the threat and future real time events 181 and 189.

The IR image presented of the alert by step (4) above consists of a choice of display options: still frames at a low data rate, slow-motion, and real time video. It is contemplated that a preferred embodiment of ISS could provide all such options. Depending upon the connectivity bandwidth, in either direction from an SA to an executive program executing on the central computer FIG. 2, 114 or returning from the central computer back to an SA executive program FIG. 11, 186, and the display capability 184 and 187, an appropriate selection can be made by each user.

Another contemplated preferred embodiment of the present invention comprises using a mobile cell-phone FIG. 11, 185 that provides an alert 185 and threat image display 184 along with a data rate available from the particular cell-phone 185. The cell-phone keyboard 185 can be used for operational actions, operational readiness tests, and making executive program changes. Operational readiness allows the user to initiate a status check by commanding each SA unit to provide a still frame image of its surveillance scene FIGS. 7A-B.

For some embodiments of the present invention, it is contemplated that a Command and Control Center FIG. 11, 188 may consist of a large number of ISS sites FIG. 6, streaming video 186, and a dedicated operator keeping track of the many user sites. Due to low false alarm rates, it is contemplated that a single operator can handle a large number of surveillance sites. A limited number of monitors in such a Command and Control Center is contemplated because the need for a display only occurs when a threat has been detected.

System Components

Each SA has three major components FIG. 2. The IRC 112 is used for initial detection and screening of the image FOV for moving objects. An IRC is required because the radiometric emissions from human sources are unidirectional, providing image stability not available with cameras that work on the principle of reflected light. This property allows thermal matching of computed IR signatures from input data coming from independent IRCs as long as the various SAs are calibrated periodically, either automatically by ISS or manually by the user as needed.

The calibration procedure requires each SA unit to process a common image scene (otherwise called surveillance area herein) where Zone A FIGS. 9A-B transmits a 95% peak, a 5% low, and a median average. The IRCs adjust their dynamic range and average scene irradiance to thermally match the other IRC(s) in each SA of a pair or group. This process using site harmonization data FIG. 3, 160a makes the two cameras radiometric sensors, and balances their electronic gain and level to make than equal. IRCs commercially available today typically have thermal contrast sensitivities in the 0.03 degrees Kelvin and are very accurate with low noise.

The computation of the polar angles defined in FIG. 4C as a second angle theta, Theta B and a second angle phi, Phi B, for SA #2 120 are corrected FIG. 2, 113 prior to transmission 114 to the edit and store function of the executive program executing at the central computer by the first order spatial aberration of the optical distortion. This corrects the apparent position of Object A from apparent spatial angle to actual spatial position in object space. This type of correction is small, less than 3 degrees, but 3 degrees (~50 milli-radians) over a 500 feet at a 10-degree angle of incidence, for example, would be several hundred feet of error at actual target location. Positional accuracies are determined by the closest SA to the target, which under most conditions is a few feet at its' grid location and a probably a few inches in target size.

In FIG. 1, the lines connecting boxes from the SAs to the database and microprocessor possibly at a Central Computer at another location indicate a connectivity medium FIG. 2, 114. ISS can use any method to transmit information in all directions, but a preferred embodiment would be entirely wireless communications.

The central computer receives the input data FIG. 3, 140, 142 about the object FIG. 9B, 111 after it is processed by the microprocessors the executive program running at the SA 113 transmits 114 the SA input data 140a to the database 150. At other times an SA can be transmitting IR images to cell-phones of a user according to FIG. 11. The executive program executing at the central computer performs other data routing functions such as: Internet site set-up data to be stored in the database 150, transmitting Target physical information to micro-processors 113 at an SA, command and control signals from the user site to the Central Computer and to micro-processors 113 at the SAs.

The Executive Program 170 provides the interne or desktop enabled application that is used for setting up the surveillance site. The information needed for set-up (the terms set-up an installation are used interchangeable herein) consists of the following. Harmonization of SA#1 and SA#2 FIG. 1, 160, FIG. 3, 160a requires the identification of the angular reference points Ca and Cb FIGS. 4A-C. The minimum range information required is Ro, h1, and h2 FIG. 8. If an OIP is used, RsSA1 and RsSA2 are also required at the security site to compute the points Ca and Cb assuming an absolute security grid reference (Xoa, Yoa) and (Xob, Yob) as depicted in FIGS. 4A-C.

The executive program provides a Site Set-up menu FIG. 10 that allows the user to insert or modify cite security information. This information is stored in the database, and is available as required.

The Central Computer FIG. 6 acts in concert with the security site SA microprocessors FIG. 2, 113 to form a distributed architecture for the ISS 3D processing of moving objects. The allocation of the computations by the ISS architecture in this manner is to provide a major reduction in the bandwidth required by the wireless network. The invention does not require any particular form for the processing architecture, only that all necessary functions are available for successful operation. As a result, data used to describe a moving object is can be transmitted at a rate of less than 2000 bits per second per SA. The microprocessor 113 in the SA processes IR image data at a rate of approximately 2 Megahertz of real time data. But data transmission rates and microprocessor image processing speeds can vary by application, and all variations are contemplated in a preferred embodiment of ISS. A wireless application with public access mobile lines or private secured and encrypted Local Area Networks (LANS) or Satellite communications are all valid options to a user of ISS.

Security Application

In many security applications there are multiple targets to be considered. The example of Object A 111, shown in FIG. 9B can be expanded to include additional objects. As long as the objects do not occupy the same physical space, the ISS 3D processing algorithms will separately identify and maintain independent classification and tracking by all SAs in a particular configuration. Once identified and classified as a Target of Interest the target properties of actual size and/or location are used to compute a unique IR signature of the object which is used to maintain separate tracking of each target. For example, if another object enters the surveillance area with Object A, and then also becomes classified as a target of interest, and say they spatially overlap, the tracking algorithm will maintain separate tracking provided there is a physical size difference or a thermal signature difference as they separate.

A contemplated preferred embodiment may be where there is more than one target, and each target may have different threat criteria. An example would be the safeguarding of a produce farm. The produce farmer, or user, defines the targets of interest as: (1) a vehicle (2) a person or persons (3) rabbits or a flock of large birds, (4) ((horses or cows) and dogs). Depending upon the season (planting, growing, or harvesting), the interest level can be adjusted to fit the threat situation.

A preferred embodiment would detect vehicles, people, and horses/cows. Rabbits, large birds or the dog are more difficult to separate due to apparent size differences may not be different enough with the crops providing ground cover. If the cameras are positioned to view the farm field parallel to the irrigation furrows for example, the view between the rows should be more than adequate. The detection of a vehicle, a person, or large animals is set by the physical size or area measured in square feet or square meters, whichever standard of measurement used. For the smaller animals size is also used, but the threat criterion may require a large number of detections (say 20 for example) over a small interval of time (say five minutes). In this way, normal losses due to rabbits and large birds is expected and tolerated. The farm dog does not trigger an alarm. However, major losses from many rabbits or crows would be detected early enough to minimize farm losses.

The targets in some scenarios consist of friends, foes, and neutrals. A typical case would be where a night watchman is guarding facilities and makes periodic rounds. In this case the night watchman is detected, and is classified as a target of interest. The whole surveillance area is designated as a threat zone. The night watch is the operational command and control (OCC), so the alert put out by ISS goes to the night watchman's cell-phone, where he sees himself depicted as the "threat". It is contemplated that a coded response sent over the cell-phone data communications link instructs the target track file that he is friendly. The target track file maintains tracking on the watchman until he leaves the surveillance area. An intruder entering the security area may trigger the same alert, but now the night watchman sees the true threat and its' precise location. This direct and real time connection between the ISS and the watchman is beneficial because the watchman may see that he is the only target in the surveillance scene and it is a false alarm. It is contemplated in a preferred embodiment of ISS that a watchman could select options on his cell-phone application running under control of the executive program to exclude himself from further tracking by ISS, but ISS will continue to track as usual any and all other potential threats of interest in the surveillance area. If, for example, wild animals are a classified as a threat, the threat definition in the database can be changed to accommodate their detection. A preferred embodiment of the present invention contemplates that when there is a real threat, the watchman is notified by ISS with real time information on the nature of the threat, the number of intruders, their locations, and if a vehicle is involved.

The preferred method of harmonizing the SAs on the surveillance area is depicted by FIG. 4C and FIGS. 7A-B. This configuration is easily set up and has the added feature of self-protection by using Security Boxes as identified in the Site Set-up menu of FIG. 10. Harmonization Method 1 (FIG. 4C) provides the baseline site information in the database identified as point Ca or (Xoa, Yoa, 0) on the grid and is the range vector RsSA1 for SA #1 and point Cb or (Xob, Yob, 0) on the grid and is the range vector RsSa2 for SA #2 as defined and shown in FIG. 4C. There are other methods of obtaining the value of Xoa, Xob, Yoa, and Yob at the security site. For example, they can be physically measured. A preferred embodiment of ISS is contemplated where a portable GPS is used to perform this task manually, or automatically by ISS.

If the security site is a body of water without identifiable reference points, another method referred to herein as Offset Initialization Point (OIP) as shown in FIG. 4D can be used to compute fictitious reference points Xoa, Xob, Yoa and Yob by the location of a common point in the surveillance area like a boat or navigational aid. The simultaneous measurement of the first angle Theta and first angle Phi for SA #1 with the second angle Theta and second angle Phi for SA #2 combined with h1, h2, and Ro provides all the necessary information to calculate the reference points. The calculation of the OIP shown in FIG. 4D results in the establishment of the Xoa & Yoa 401 & Xob & Yob 402 as shown in FIG. 4E, and, for reference, the OIP of FIG. 4D corresponds to the point 403 of FIG. 4E.

A contemplated preferred embodiment of ISS provides security for the site and security for the system itself. The main features of this preferred embodiment are: (1) self-contained power, loss of commercial power is detected and the system maintains function while alerting the user about the loss of power; (2) loss of video, the loss of video at any SA position could indicate a direct assault against the SA. For example, placing a bag over an SA unit would negate the sensors target detection capability. Alert and inform user; (3)

loss of wireless connectivity is detected by an SA unit by failure to respond to simple automatic maintenance actions (i.e. dynamic scene balancing by executive program). Alert and inform user; (4) jamming of wireless data communications by power sources operating at the wireless transport frequencies. Alert and inform user.

ISS is designed to detect and report 3D moving objects. The detection of 3D objects by a 2D sensor provides no information, by itself, on the depth of the target. It only locates the enjoinment of an object at the surface of a surveillance area. The image processing algorithms used by standard, commercially available, IRCs treat the full angular size of an object as an extension of the ground where it is located to an equivalent height without considering depth. A second IRC and image processor provides information that enables the common center of an object to be computed at an (x, y, z) coordinate grid that is essentially a projection of the two SAs' line-of-sight vectors to a point that is below the surface of the ground. The microprocessor recognizes this has happened because the z point (height) is negative (i.e. below ground). The microprocessor performs a simple calculation to determine the intersection of the line of sight target vector with the surface of the surveillance horizontal plane. This is performed for both SA units where the intersection point with the ground represents each end of the extended target. The radial difference between the surface points corresponds to the depth of the target. This feature is important for several reasons. First, the depth of the target could be a significant feature in discriminating similar targets. Secondly, an extended target is likely a vehicle. Non-warm blooded targets do not have the omni-directional thermal radiation characteristics that are useful in identifying unique aspects of an object. The IR signatures of front and back are uncorrelated and using an average common thermal signature must be avoided. By knowing these properties of extended targets, ISS can down weight the thermal matching as a metric for such targets.

ISS provides an abundance of information to assess and make a determination of a potential threat. Time spatial averaging is employed for filtering the input data as it is received at fixed intervals. Sequentially over time, the input data is describing a changing physical process, like a man walking or running. The data is captured and sent using a capture timestamp that enables the incoming data to be matched by time across SAs, and this data can be smoothed and best-fitted to fit a linear curve. This process allows the accommodation of lost or errant input data, or input data packet, transmissions with little effect on the linear curve approximation. Propagation delays in the transmission 186 and receipt of input data 140, 142, or notify user data FIG. 1, 180, FIG. 11, 180, 181, 184, 185, 187, 188, 189. A second consideration is that the wireless high speed data link 186 must accommodate propagation delays in the transmission and receipt of data. When there are two or more independent sources of input data, like SA #1 and SA #2 in the present embodiment, the time uncertainty between the two data streams 140 and 142 can use "Best Estimate" correlation where the dependent variable is a relative time difference between the two input data time points. This enables ISS to automatically correct the time uncertainty and maintain the desired level of precision required by the user. Once the data sets are adjusted to a common time base the calculations of target position, size, and shape (aspect) can proceed. The preferred solution for ISS is to use the closed form solution provided by the isosceles triangle as depicted in FIGS. 4A-C. The other methods to compute target information use directional cosines and finite element analysis. Depending upon the target and its location in the surveillance area the various methods each have their own advantages and disadvantages. ISS discloses all three solutions as viable alternatives, and for illustration purposes, the isosceles triangle was used as an example to best describe the capabilities of the various embodiments of the invention.

It is contemplated that a preferred embodiment of the present invention would exploit "Best Estimation" techniques to use all three solutions with best estimation weighting factors. Best estimation techniques are employed using thermal matching of IR signatures containing area size and/or location information, and/or movement over time. Aspect ratio matching is another variable that is helpful to ensure that multiple targets can be accommodated. These factors are not required to match objects between the two SAs, but they can provide confidence levels on the accuracy of the match.

The previously described embodiments of the present invention have many advantages, including automated surveillance and low cost accuracy of detection, tracking and reporting predefined threat criteria. Although the present invention has been described in considerable detail with reference to certain preferred embodiments thereof, other alternative embodiments are possible. Therefore, the spirit and scope of the claims should not be limited to the description of the preferred embodiments, nor the alternative embodiments, contained herein.

What is claimed is:

1. A computer-implemented system for simultaneously discriminating 3D moving objects in a surveillance area comprising, in combination:
   at least two IR cameras positioned at pre-established heights and distance apart focused on said surveillance area at pre-determined polar angles that establish optical center lines of site for each of said at least two IR cameras so that measured data from said at least two IR cameras is used to produce target sizes in linear dimensions and physical locations;
   at least one microprocessor in electronic communication with said at least two IR cameras;
   at least one memory in electronic communication with said at least one microprocessor;
   at least one database associated with a user stored in said at least one memory containing data of said pre-determined polar angles, said pre-established heights and distance apart, input data simultaneously captured by said at least two IR cameras and electronically communicated to said microprocessor for storage into said at least one database, and data of pre-defined IR signatures classified as threats by said user; and
   a computer program comprising program modules executable by said at least one microprocessor, wherein said at least one microprocessor is directed by said program modules of said computer program to
   (a) compute IR signatures of said 3D moving objects using said data of said pre-determined polar angles, said pre-established heights and distance apart, and said input data producing computed IR signatures,
   (b) compare said computed IR signatures to said data of pre-defined IR signatures classified as threats by said user, and
   (c) electronically notify said user when said computed IR signatures match said data of pre-defined IR signatures classified as threats by said user.

2. The system of claim 1 wherein said computed IR signatures are area sizes of said 3D moving objects.

3. The system of claim 2 wherein said data of pre-defined IR signatures classified as threats by said user further comprises at least one threat area size.

4. The system of claim 1 wherein said computed IR signatures are area sizes and object locations of said 3D moving objects.

5. The system of claim 4 wherein said data of pre-defined IR signatures classified as threats by said user further comprises at least one threat area size and at least one threat object location.

6. The system of claim 1, 2, 3, 4 or 5 wherein said at least one microprocessor is further directed by said program modules of said computer program to electronically notify said user by transmitting an alarm text message when said computed IR signatures match said data of pre-defined IR signatures classified as threats by said user.

7. The system of claim 1, 2, 3, 4 or 5 wherein said at least one microprocessor is further directed by said program modules of said computer program to electronically notify said user by transmitting a real time image of said surveillance area when said computed IR signatures match said data of pre-defined IR signatures classified as threats by said user.

8. The system of claim 1, 2, 3, 4 or 5 wherein said at least one microprocessor is further directed by said program modules of said computer program to electronically notify said user by transmitting a real time video when said computed IR signatures match said data of pre-defined IR signatures classified as threats by said user.

9. The system of claim 1, 2, 3, 4 or 5 wherein said input data simultaneously captured by said at least two IR cameras further comprises a first average apparent intensity data element originating from one of said at least two IR cameras and a second average apparent intensity data element originating from another of said at least two IR cameras, said at least one microprocessor being further directed by said program modules of said computer program to determine a range adjusted variance value between said first and said second average apparent intensity data elements and to compare said range adjusted variance value to data of pre-defined IR signatures classified as false alarms by said user, and to electronically notify said user when said range adjusted variance value matches said data of pre-defined IR signatures classified as false alarms by said user by transmitting a malfunction text message.

10. The system of claim 1, 2, 3, 4 or 5 wherein said input data simultaneously captured by said at least two IR cameras further comprises a first average apparent intensity data element originating from one of said at least two IR cameras and a second average apparent intensity data element originating from another of said at least two IR cameras, said at least one microprocessor being further directed by said program modules of said computer program to determine a range adjusted variance value between said first and said second average apparent intensity data elements and to compare said range adjusted variance value to data of pre-defined IR signatures classified as false alarms by said user, and to electronically notify said user when said range adjusted variance value matches said data of pre-defined IR signatures classified as false alarms by said user by transmitting a real time image of said surveillance area.

11. The system of claim 1, 2, 3, 4 or 5 wherein said input data simultaneously captured by said at least two IR cameras further comprises a first average apparent intensity data element originating from one of said at least two IR cameras and a second average apparent intensity data element originating from another of said at least two IR cameras, said at least one microprocessor being further directed by said program modules of said computer program to determine a range adjusted variance value between said first and said second average apparent intensity data elements and to compare said range adjusted variance value to data of pre-defined IR signatures classified as false alarms by said user, and to electronically notify said user when said range adjusted variance value matches said data of pre-defined IR signatures classified as false alarms by said user by transmitting a real time video of said surveillance area.

12. The system of claim 1, 2, 3, 4 or 5 wherein said pre-determined polar angles that establish optical center lines of site for each of said at least two IR cameras are theta1, ph1, theta2 and phi2, and said input data simultaneously captured by said at least two IR cameras further comprises data for a first sensor assembly id, timestamp, azimuth angle, elevation angle, angular area of said 3D moving object, aspect ratio of said 3D moving object, and average apparent intensity of said 3D moving object originating from one of said at least two IR cameras and a second sensor assembly, azimuth angle, elevation angle, angular area of said 3D moving object, aspect ratio of said 3D moving object, and an average apparent intensity of said 3D moving object originating from another of said at least two IR cameras.

13. The system of claim 12 wherein said at least one microprocessor is further directed by said program modules of said computer program to determine a range adjusted variance value between said first and said second average apparent intensity data elements and to compare said range adjusted variance value to data of pre-defined IR signatures classified as false alarms by said user, and to electronically notify said user when said range adjusted variance value matches said data of pre-defined IR signatures classified as false alarms by said user by transmitting a malfunction text message and a real time image of said surveillance area, said at least one microprocessor being further directed by said program modules of said computer program to electronically notify said user by transmitting a real time video when said computed IR signatures match said data of pre-defined IR signatures classified as threats by said user.

14. The system of claim 1, 2, 3, 4 or 5 wherein said at least two IR cameras are further positioned such that at least one of said at least two IR cameras has another of said at least two IR cameras within said at least one of said at least two IR cameras' field of view and said another of said at least two IR cameras has said at least one of said at least two IR cameras within said another of said at least two IR cameras' field of view for pre-establishing a 3D coordinate grid for common location information between said at least one and said another of said at least two IR cameras.

15. The system of claim 12 wherein said at least two IR cameras are further positioned such that at least one of said at least two IR cameras has another of said at least two IR cameras within said at least one of said at least two IR cameras' field of view and said another of said at least two IR cameras has said at least one of said at least two IR cameras within said another of said at least two IR cameras' field of view for pre-establishing a 3D coordinate grid for common location information between said at least one and said another of said at least two IR cameras.

16. The system of claim 1, 2, 3, 4 or 5 wherein said at least two IR cameras are further positioned such that each IR camera of at least one pair of said at least two IR cameras have a common reference point within said each IR cameras' field of view for pre-establishing a 3D coordinate grid for common location information between said each IR camera of at least one pair.

17. The system of claim 12 wherein said at least two IR cameras are further positioned such that each IR camera of at least one pair of said at least two IR cameras have a common reference point within said each IR cameras' field of view for pre-establishing a 3D coordinate grid for common location information between said each IR camera of at least one pair.

18. The system of claim 1, 2, 3, 4 or 5 wherein said at least one microprocessor is further directed by said program modules of said computer program to electronically perform self diagnostic testing and correction at a regular interval and said at least one microprocessor is further directed by said program modules of said computer program to notify said user when manual intervention is required by electronic communication to a cell phone of said user.

19. The system of claim 12 wherein said at least one microprocessor is further directed by said program modules of said computer program to electronically perform self diagnostic testing and correction at a regular interval and said at least one microprocessor is further directed by said program modules of said computer program to notify said user when manual intervention is required by electronic communication to a cell phone of said user.

20. A computer-implemented method for simultaneously discriminating 3D moving objects in a surveillance area, comprising using at least two IR cameras positioned at pre-established heights and distance apart focused on said surveillance area at pre-determined polar angles that establish optical center lines of site for each of said at least two IR cameras so that measured data from said at least two IR cameras is used to produce target sizes in linear dimensions and physical locations, at least one microprocessor in electronic communication with said at least two IR cameras, at least one memory in electronic communication with said at least one microprocessor, at least one database associated with a user stored in said at least one memory containing data of said pre-determined polar angles, said pre-established heights and distance apart, input data simultaneously captured by said at least two IR cameras and electronically communicated to said microprocessor for storage into said at least one database, and data of pre-defined IR signatures classified as threats by said user, and
  a computer program comprising program modules executable by said at least one microprocessor, wherein said at least one microprocessor is directed by said program modules of said computer program to perform the following steps:
   (a) compute IR signatures of said 3D moving objects using said data of said pre-determined polar angles, said pre-established heights and distance apart, and said input data producing computed IR signatures,
   (b) compare said computed IR signatures to said data of pre-defined IR signatures classified as threats by said user, and
   (c) electronically notify said user when said computed IR signatures match said data of pre-defined IR signatures classified as threats by said user.

21. The method of claim 20 wherein said computed IR signatures are area sizes of said 3D moving objects.

22. The method of claim 21 wherein said data of pre-defined IR signatures classified as threats by said user further comprises at least one threat area size.

23. The method of claim 20 wherein said computed IR signatures are area sizes and object locations of said 3D moving objects.

24. The method of claim 23 wherein said data of pre-defined IR signatures classified as threats by said user further comprises at least one threat area size and at least one threat object location.

25. The method of claim 20, 21, 22, 23 or 24 wherein said at least one microprocessor is further directed by said program modules of said computer program to perform an additional step of electronically notifying said user by transmitting an alarm text message when said computed IR signatures match said data of pre-defined IR signatures classified as threats by said user.

26. The method of claim 20, 21, 22, 23 or 24 wherein said at least one microprocessor is further directed by said program modules of said computer program to perform an additional step of electronically notifying said user by transmitting a real time image of said surveillance area when said computed IR signatures match said data of pre-defined IR signatures classified as threats by said user.

27. The method of claim 20, 21, 22, 23 or 24 wherein said at least one microprocessor is further directed by said program modules of said computer program to perform an additional step of electronically notifying said user by transmitting a real time video when said computed IR signatures match said data of pre-defined IR signatures classified as threats by said user.

28. The method of claim 20, 21, 22, 23 or 24 wherein said input data simultaneously captured by said at least two IR cameras further comprises a first average apparent intensity data element originating from one of said at least two IR cameras and a second average apparent intensity data element originating from another of said at least two IR cameras, said at least one microprocessor is further directed by said program modules of said computer program to perform an additional step of determining a range adjusted variance value between said first and said second average apparent intensity data elements and to compare said range adjusted variance value to data of pre-defined IR signatures classified as false alarms by said user, and said at least one microprocessor is further directed by said program modules of said computer program to perform an additional step of electronically notifying said user when said range adjusted variance value matches said data of pre-defined IR signatures classified as false alarms by said user by transmitting a malfunction text message.

29. The method of claim 20, 21, 22, 23 or 24 wherein said input data simultaneously captured by said at least two IR cameras further comprises a first average apparent intensity data element originating from one of said at least two IR cameras and a second average apparent intensity data element originating from another of said at least two IR cameras, said at least one microprocessor is further directed by said program modules of said computer program to perform an additional step of determining a range adjusted variance value between said first and said second average apparent intensity data elements and to compare said range adjusted variance value to data of pre-defined IR signatures classified as false alarms by said user, and said at least one microprocessor is further directed by said program modules of said computer program to perform an additional step of electronically notifying said user when said range adjusted variance value matches said data of pre-defined IR signatures classified as false alarms by said user by transmitting a real time image of said surveillance area.

30. The method of claim 20, 21, 22, 23 or 24 wherein said input data simultaneously captured by said at least two IR cameras further comprises a first average apparent intensity data element originating from one of said at least two IR cameras and a second average apparent intensity data element originating from another of said at least two IR cameras, said at least one microprocessor is further directed by said program modules of said computer program to perform an additional step of determining a range adjusted variance value between said first and said second average apparent intensity data elements and to compare said range adjusted variance value to data of pre-defined IR signatures classified as false alarms by said user, and said at least one microprocessor is further directed by said program modules of said computer program to perform an additional step of electronically notifying said user when said range adjusted variance value matches said data of pre-defined IR signatures classified as false alarms by said user by transmitting a real time video of said surveillance area.

31. The method of claim 20, 21, 22, 23 or 24 wherein said pre-determined polar angles that establish optical center lines of site for each of said at least two IR cameras are theta1, ph1, theta2 and phi2, and said input data simultaneously captured by said at least two IR cameras further comprises data for a first sensor assembly id, timestamp, azimuth angle, elevation angle, angular area of said 3D moving object, aspect ratio of said 3D moving object, and average apparent intensity of said 3D moving object originating from one of said at least two IR cameras and a second sensor assembly, azimuth angle, elevation angle, angular area of said 3D moving object, aspect ratio of said 3D moving object, and an average apparent intensity of said 3D moving object originating from another of said at least two IR cameras.

32. The method of claim 31 wherein said at least one microprocessor is further directed by said program modules of said computer program to perform an additional step of determining a range adjusted variance value between said first and said second average apparent intensity data elements and to compare said range adjusted variance value to data of pre-defined IR signatures classified as false alarms by said user, and said at least one microprocessor is further directed by said program modules of said computer program to perform an additional step of electronically notifying said user when said range adjusted variance value matches said data of pre-defined IR signatures classified as false alarms by said user by transmitting a malfunction text message and a real time image of said surveillance area, said at least one microprocessor is further directed by said program modules of said computer program to perform an additional step of electronically notifying said user by transmitting a real time video when said computed IR signatures match said data of pre-defined IR signatures classified as threats by said user.

33. The method of claim 20, 21, 22, 23 or 24 wherein said at least two IR cameras are further positioned such that at least one of said at least two IR cameras has another of said at least two IR cameras within said at least one of said at least two IR cameras' field of view and said another of said at least two IR cameras has said at least one of said at least two IR cameras within said another of said at least two IR cameras' field of view for pre-establishing a 3D coordinate grid for common location information between said at least one and said another of said at least two IR cameras.

34. The method of claim 31 wherein said at least two IR cameras are further positioned such that at least one of said at least two IR cameras has another of said at least two IR cameras within said at least one of said at least two IR cameras' field of view and said another of said at least two IR cameras has said at least one of said at least two IR cameras within said another of said at least two IR cameras' field of view for pre-establishing a 3D coordinate grid for common location information between said at least one and said another of said at least two IR cameras.

35. The method of claim 20, 21, 22, 23 or 24 wherein said at least two IR cameras are further positioned such that each IR camera of at least one pair of said at least two IR cameras have a common reference point within said each IR cameras' field of view for pre-establishing a 3D coordinate grid for common location information between said each IR camera of at least one pair.

36. The method of claim 31 wherein said at least two IR cameras are further positioned such that each IR camera of at least one pair of said at least two IR cameras have a common reference point within said each IR cameras' field of view for pre-establishing a 3D coordinate grid for common location information between said each IR camera of at least one pair.

37. The method of claim 20, 21, 22, 23 or 24 wherein said at least one microprocessor is further directed by said program modules of said computer program to perform an additional step of electronically performing self diagnostic testing and correction at a regular interval and said at least one microprocessor is further directed by said program modules of said computer program to perform an additional step of notifying said user when manual intervention is required by electronic communication to a cell phone of said user.

38. The method of claim 31, wherein said at least one microprocessor is further directed by said program modules of said computer program to perform an additional step of electronically performing self diagnostic testing and correction at a regular interval and said at least one microprocessor is further directed by said program modules of said computer program to perform an additional step of notifying said user when manual intervention is required by electronic communication to a cell phone of said user.

39. A memory for storing data for access by an application program being executed on a data processing system comprising:
   a data structure stored in said memory, said data structure including information resident in a database used by said application program and including,
   a first sensor assembly identification field containing information identifying a first sensor assembly as a unique source of a first set of data elements continuously transmitted while a 3D object is moving within its field of view, said first sensor assembly being one of said first set of data elements,
   a second sensor assembly identification field containing information identifying a second sensor assembly as a unique source of a second set of data elements continuously transmitted while a 3D object is moving within its field of view, said second sensor assembly being one of said second set of data elements,
   a first timestamp identification field containing information identifying a capture time of said first set of data elements, said first timestamp being one of said first set of data elements,
   a second timestamp identification field containing information identifying a capture time of said second set of data elements, said second timestamp being one of said second set of data elements,
   a first height identification field containing information identifying a pre-established height of said first sensor assembly,
   a second height identification field containing information identifying a pre-established height of said second sensor assembly,
   an Ro distance identification field containing information identifying a pre-established distance between said first sensor assembly and said second sensor assembly,
   a first angle theta identification field containing information identifying an angle theta1 corresponding to said first sensor assembly, a second angle theta identification field containing information identifying an angle theta2 corresponding to said second sensor assembly,
a first angle phi identification field containing information identifying an angle phi1 corresponding to said first sensor assembly,
a second angle phi identification field containing information identifying and angle phi2 corresponding to said second sensor assembly,
a first azimuth angle identification field containing information identifying an azimuth angle corresponding to said first sensor assembly,
a second azimuth angle identification field containing information identifying an azimuth angle corresponding to said second sensor assembly,
a first elevation angle identification field containing information identifying an elevation angle corresponding to said first sensor assembly,
a second elevation angle identification field containing information identifying an elevation angle corresponding to said second sensor assembly,
a first angular area identification field containing information identifying an angular area corresponding to said first sensor assembly,
a second angular area identification field containing information identifying an angular area corresponding to said second sensor assembly,
a first aspect ratio identification field containing information identifying an aspect ratio corresponding to said first sensor assembly,
a second aspect ratio identification field containing information identifying an aspect ratio corresponding to said second sensor assembly,
pre-defined IR signaturesT identification field containing information identifying pre-defined IR signatures classified as threats,
compIRsigs—computed IR signatures identification field containing information identifying computed area sizes and locations for 3D moving objects identified as true targets.

40. The memory of claim 39 comprising said data structure, wherein said first timestamp further includes a capture date of said first set of data elements and said second timestamp further includes a capture date of said second set of data elements.

41. The memory of claim 39 or 40 and further including:
a pre-defined IR signaturesF identification field containing information identifying pre-defined IR signatures classified as false alarms.

42. The memory of claim 39 or 40 and further including:
a first average apparent intensity identification field containing information identifying an average apparent intensity of a 3D moving object corresponding to said first sensor assembly,
a second average apparent intensity identification field containing information identifying an average apparent intensity of a 3D moving object corresponding to said second sensor assembly and
a pre-defined IR signaturesF identification field containing information identifying pre-defined IR signatures classified as false alarms.

43. The memory of claim 39 or 40 and further including:
a user account identification field containing information identifying a customer account associated with said first sensor assembly and said second sensor assembly, and
a pre-defined IR signaturesF identification field containing information identifying pre-defined IR signatures classified as false alarms.

44. The memory of claim 39 or 40 and further including
a first average apparent intensity identification field containing information identifying an average apparent intensity of a 3D moving object corresponding to said first sensor assembly,
a second average apparent intensity identification field containing information identifying an average apparent intensity of a 3D moving object corresponding to said second sensor assembly,
a user account identification field containing information identifying a customer account associated with said first sensor assembly and said second sensor assembly, and
a pre-defined IR signaturesF identification field containing information identifying pre-defined IR signatures classified as false alarms.

* * * * *